United States Patent
Wang et al.

(10) Patent No.: US 12,140,735 B2
(45) Date of Patent: Nov. 12, 2024

(54) OPTICAL IMAGING LENS ASSEMBLY

(71) Applicant: Zhejiang Sunny Optics Co., Ltd, Yuyao (CN)

(72) Inventors: Xiaofang Wang, Yuyao (CN); Kaiyuan Zhang, Yuyao (CN); Fujian Dai, Yuyao (CN); Liefeng Zhao, Yuyao (CN)

(73) Assignee: Zhejiang Sunny Optics Co., Ltd (CN)

( * ) Notice: Subject to any disclaimer, the term of this patent is extended or adjusted under 35 U.S.C. 154(b) by 771 days.

(21) Appl. No.: 17/199,409

(22) Filed: Mar. 11, 2021

(65) Prior Publication Data
US 2021/0318521 A1 Oct. 14, 2021

(30) Foreign Application Priority Data
Apr. 9, 2020 (CN) .................. 202010273251.2

(51) Int. Cl.
  G02B 13/00 (2006.01)
  G02B 9/64 (2006.01)
  G02B 27/00 (2006.01)
(52) U.S. Cl.
  CPC ........... G02B 13/0045 (2013.01); G02B 9/64 (2013.01); G02B 27/0025 (2013.01)
(58) Field of Classification Search
  CPC .. G02B 13/0045; G02B 9/64; G02B 27/0025; G02B 13/18; G02B 27/0012; G02B 13/06
  See application file for complete search history.

(56) References Cited

U.S. PATENT DOCUMENTS

| | | | | |
|---|---|---|---|---|
| 9,874,723 | B2* | 1/2018 | Shi | G02B 13/0045 |
| 2017/0336606 | A1* | 11/2017 | Lai | G02B 9/64 |
| 2018/0106987 | A1* | 4/2018 | Lin | G02B 27/0025 |
| 2019/0278062 | A1* | 9/2019 | Chen | G02B 13/0045 |
| 2019/0324232 | A1* | 10/2019 | Huang | G02B 9/64 |
| 2021/0088755 | A1* | 3/2021 | Nitta | G02B 27/0025 |
| 2021/0255429 | A1* | 8/2021 | Lin | G02B 13/0045 |
| 2022/0011540 | A1* | 1/2022 | Sun | G02B 9/64 |
| 2022/0011547 | A1* | 1/2022 | Sun | G02B 13/0045 |

FOREIGN PATENT DOCUMENTS

IN 201924014246 1/2020

OTHER PUBLICATIONS

Gross Herbert et al. Handbook of Optical Systems, 2007, Wiley-VCH, vol. 3: Aberration Theory and Correction of Optical Systems, pp. 377-379 (Year: 2007).*
India First Examination Report for Application 202114011554, dated Feb. 2, 2022, 5 pages.

* cited by examiner

*Primary Examiner* — Mustak Choudhury
*Assistant Examiner* — K Muhammad
(74) *Attorney, Agent, or Firm* — Barnes & Thornburg LLP

(57) ABSTRACT

The present disclosure discloses an optical imaging lens assembly including, sequentially from an object side to an image side along an optical axis, a first lens having negative refractive power; a second lens having refractive power; a third lens; a fourth lens having refractive power, a convex image-side surface and a concave image-side surface; a fifth lens having refractive power and a concave object-side surface; a sixth lens; and a seventh lens. Half of a diagonal length ImgH of an effective pixel area on an imaging plane of the optical imaging lens assembly satisfies: ImgH≥5.20 mm.

16 Claims, 12 Drawing Sheets

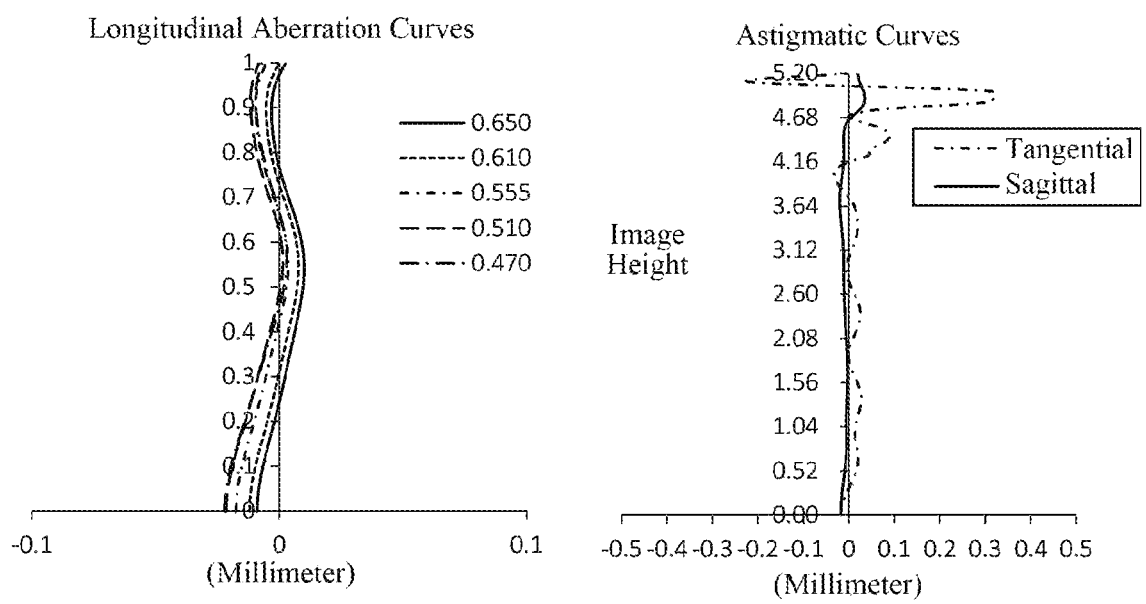
Fig. 8A
Fig. 8B
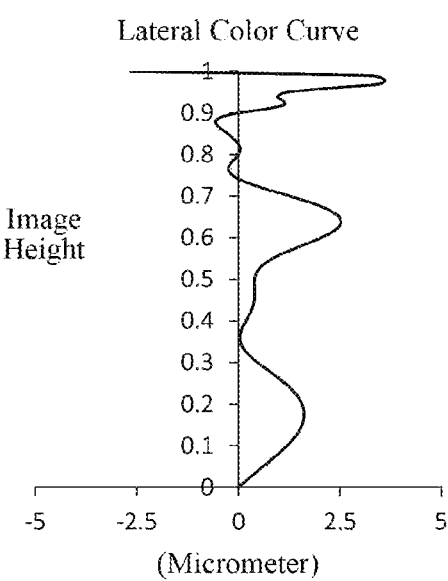
Fig. 8C

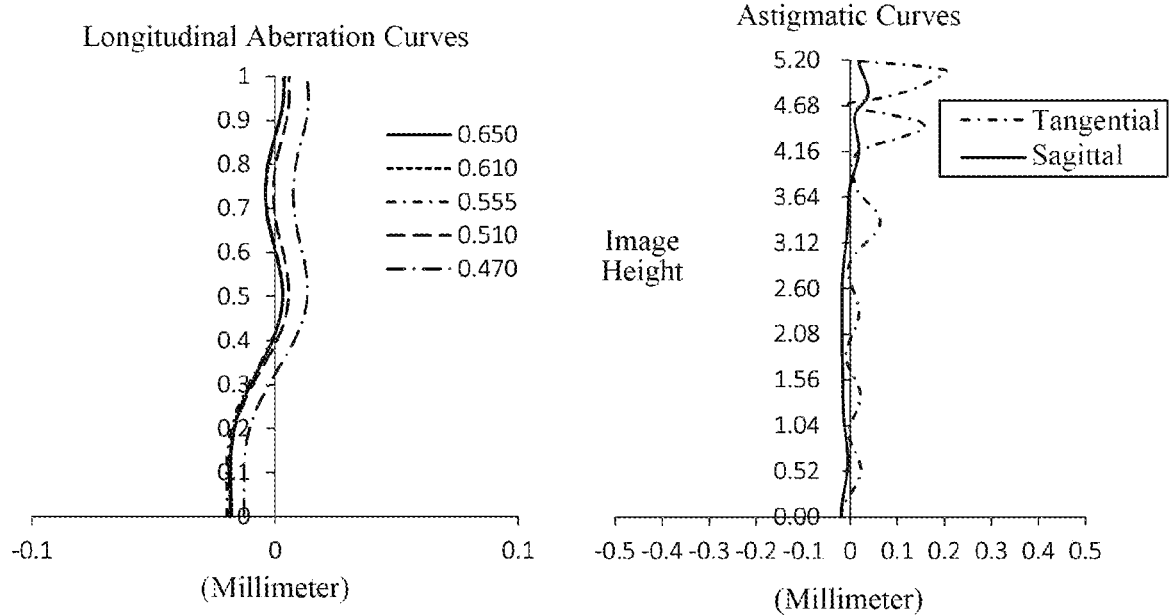
Fig. 12A
Fig. 12B
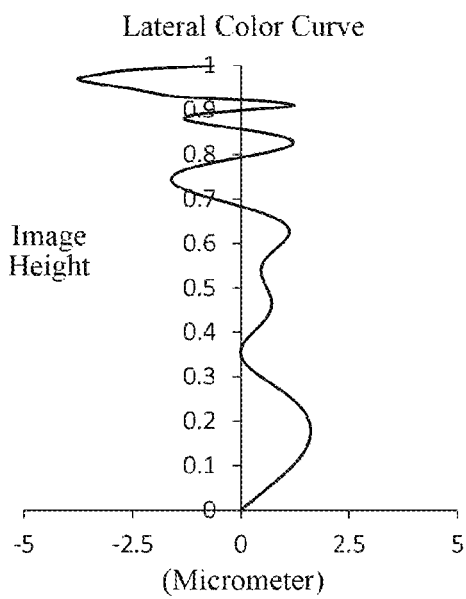
Fig. 12C

OPTICAL IMAGING LENS ASSEMBLY

CROSS-REFERENCE TO RELATED APPLICATION

This application claims benefit of priority to Chinese Patent Application No. 202010273251.2 filed on Apr. 9, 2020 before the China National Intellectual Property Administration, the entire disclosure of which is incorporated herein by reference in its entity.

TECHNICAL FIELD

The present disclosure relates to the field of optical elements, and more specifically, relates to an optical imaging lens assembly.

BACKGROUND

With the upgrading of consumer electronic products and the development of the functions of the image software or video software on the consumer electronic products, portable devices, such as mobile phones or tablet computers, are usually equipped with camera modules to enable the portable devices to have camera functions. The camera module is usually provided with a Charge-Coupled Device (CCD) type image sensor or a Complementary Metal-Oxide Semiconductor (CMOS) type image sensor, and provided with an optical imaging lens assembly. The optical imaging lens assembly may collect the light from the object side. The imaging light travels along the optical path of the optical imaging lens assembly and irradiates the image sensor, and then the image sensor converts the light signal into an electrical signal to form image data.

The portable devices are becoming increasingly thinner and lighter. As the performance of CCD and CMOS elements increases and the size thereof reduces, especially as the large-size and high-pixel CMOS chips being popular, higher requirements for high imaging quality and miniaturization are placed on the corresponding imaging lens assemblies.

In order to meet the requirements of miniaturization and imaging requirements, an optical imaging lens assembly with characteristics, such as a large imaging plane and a large wide-angle is required on the basis of being miniaturization.

SUMMARY

The present disclosure provides an optical imaging lens assembly that is applicable to portable electronic products and at least solves or partially solves at least one of the above disadvantages of the prior art.

In one aspect, the present disclosure provides an optical imaging lens assembly which includes, sequentially from an object side to an image side along an optical axis, a first lens having negative refractive power; a second lens having refractive power; a third lens; a fourth lens having refractive power, a convex object-side surface and a concave image-side surface; a fifth lens having refractive power and a concave object-side surface; a sixth lens; and a seventh lens. Half of a diagonal length ImgH of an effective pixel area on an imaging plane of the optical imaging lens assembly may satisfy: ImgH≥5.20 mm.

In one embodiment, at least one of an object-side surface of the first lens to an image-side surface of the seventh lens is aspheric.

In one embodiment, a total effective focal length f of the optical imaging lens assembly and half of a maximum field-of-view Semi-FOV of the optical imaging lens assembly may satisfy: 5 mm<f*tan(Semi-FOV)<7 mm.

In one embodiment, a maximum field-of-view FOV of the optical imaging lens assembly may satisfy: 110°<FOV<130°.

In one embodiment, a distance TTL along the optical axis from an object-side surface of the first lens to the imaging plane and half of the diagonal length ImgH of the effective pixel area on the imaging plane may satisfy: TTL/ImgH<1.55.

In one embodiment, an effective focal length f7 of the seventh lens and a radius of curvature R13 of an object-side surface of the seventh lens may satisfy: |f7/R13|<1.7.

In one embodiment, a radius of curvature R7 of the object-side surface of the fourth lens and a radius of curvature R8 of the image-side surface of the fourth lens may satisfy: 1.5<(R7+R8)/R8<4.1.

In one embodiment, a total effective focal length f of the optical imaging lens assembly, an effective focal length f6 of the sixth lens and an effective focal length f7 of the seventh lens may satisfy: 2.0<|f/f6|±|f/f7|<3.5.

In one embodiment, a center thickness CT1 of the first lens along the optical axis, a center thickness CT2 of the second lens along the optical axis, a center thickness CT3 of the third lens along the optical axis, and a spaced interval T23 between the second lens and the third lens along the optical axis may satisfy: 4.5<(CT1+CT2+CT3)/T23<7.5.

In one embodiment, a radius of curvature R7 of the object-side surface of the fourth lens and a total effective focal length f of the optical imaging lens assembly may satisfy: 0.5<R7/f<3.5.

In one embodiment, SAG11, being an on-axis distance from an intersection of an object-side surface of the first lens and the optical axis to a vertex of an effective radius of the object-side surface of the first lens, and SAG71, being an on-axis distance from an intersection of an object-side surface of the seventh lens and the optical axis to a vertex of an effective radius of the object-side surface of the seventh lens, may satisfy: −2<SAG11/SAG71<0.

In one embodiment, an edge thickness ET3 of the third lens and an on-axis distance SAG32 from an intersection of an image-side surface of the third lens and the optical axis to a vertex of an effective radius of the image-side surface of the third lens may satisfy: −1.0<ET3/SAG32<−0.5.

In one embodiment, a combined focal length f234 of the second lens, the third lens, and the fourth lens and a total effective focal length f of the optical imaging lens assembly may satisfy: 1.0<f234/f<2.0.

In one embodiment, an edge thickness ET7 of the seventh lens may satisfy: 1.0 mm<ET7<1.5 mm.

In one embodiment, the optical imaging lens assembly further includes a stop, and the stop is disposed between the second lens and the third lens.

In one embodiment, an object-side surface of the seventh lens may be convex, and an image-side surface of the seventh lens may be concave.

In a second aspect, the present disclosure provides an optical imaging lens assembly which includes, sequentially from an object side to an image side along an optical axis, a first lens having negative refractive power; a second lens having refractive power; a third lens; a fourth lens having refractive power, a convex object-side surface and a concave image-side surface; a fifth lens having refractive power; a sixth lens; and a seventh lens. A total effective focal length f of the optical imaging lens assembly and half of a maximum field-of-view Semi-FOV of the optical imaging lens assembly may satisfy: 5 mm<f*tan(Semi-FOV)<7 mm.

In one embodiment, a maximum field-of-view FOV of the optical imaging lens assembly may satisfy: 110°<FOV<130°.

In one embodiment, half of a diagonal length ImgH of an effective pixel area on an imaging plane of the optical imaging lens assembly may satisfy: ImgH≥5.20 mm.

In one embodiment, a distance TTL along the optical axis from an object-side surface of the first lens to an imaging plane and half of a diagonal length ImgH of an effective pixel area on the imaging plane may satisfy: TTL/ImgH<1.55.

In one embodiment, an effective focal length f7 of the seventh lens and a radius of curvature R13 of an object-side surface of the seventh lens may satisfy: |f7/R13|<1.7.

In one embodiment, a radius of curvature R7 of the object-side surface of the fourth lens and a radius of curvature R8 of the image-side surface of the fourth lens may satisfy: 1.5<(R7+R8)/R8<4.1.

In one embodiment, the total effective focal length f of the optical imaging lens assembly, an effective focal length f6 of the sixth lens and an effective focal length f7 of the seventh lens may satisfy: 2.0<|f/f6|+|f/f7|<3.5.

In one embodiment, a center thickness CT1 of the first lens along the optical axis, a center thickness CT2 of the second lens along the optical axis, a center thickness CT3 of the third lens along the optical axis and a spaced interval T23 between the second lens and the third lens along the optical axis may satisfy: 4.5<(CT1+CT2+CT3)/T23<7.5.

In one embodiment, a radius of curvature R7 of the object-side surface of the fourth lens and the total effective focal length f of the optical imaging lens assembly may satisfy: 0.5<R7/f<3.5.

In one embodiment, SAG11, being an on-axis distance from an intersection of an object-side surface of the first lens and the optical axis to a vertex of an effective radius of the object-side surface of the first lens, and SAG71, being an on-axis distance from an intersection of an object-side surface of the seventh lens and the optical axis to a vertex of an effective radius of the object-side surface of the seventh lens, may satisfy: −2<SAG11/SAG71<0.

In one embodiment, an edge thickness ET3 of the third lens and an on-axis distance SAG32 from an intersection of an image-side surface of the third lens and the optical axis to a vertex of an effective radius of the image-side surface of the third lens may satisfy: −1.0<ET3/SAG32<−0.5.

In one embodiment, a combined focal length f234 of the second lens, the third lens, and the fourth lens and the total effective focal length f of the optical imaging lens assembly may satisfy: 1.0<f234/f<2.0.

In one embodiment, an edge thickness ET7 of the seventh lens may satisfy: 1.0 mm<ET7<1.5 mm.

In one embodiment, the optical imaging lens assembly further includes a stop, and the stop is disposed between the second lens and the third lens.

In one embodiment, an object-side surface of the fifth lens may be concave.

In one embodiment, an object-side surface of the seventh lens may be convex, and an image-side surface thereof may be concave.

The present disclosure employs seven lenses, and the above optical imaging lens assembly has at least one beneficial effect, such as large image plane, large wide angle, miniaturization, and good image quality and the like, by rationally configuring the refractive power, the surface shape, the center thickness of each lens, and the on-axis spaced interval between the lenses and the like.

BRIEF DESCRIPTION OF THE DRAWINGS

Other features, objects, and advantages of the present disclosure will become more apparent from the following detailed description of the non-limiting embodiments with reference to the accompanying drawings. In the drawings:

FIGS. 8A to 8C illustrate longitudinal aberration curves, astigmatic curves, and a lateral color curve of the optical imaging lens assembly of the example 4, respectively.

FIGS. 12A to 12C illustrate longitudinal aberration curves, astigmatic curves, and a lateral color curve of the optical imaging lens assembly of the example 6, respectively.

DETAILED DESCRIPTION OF EMBODIMENTS

Figure 1:
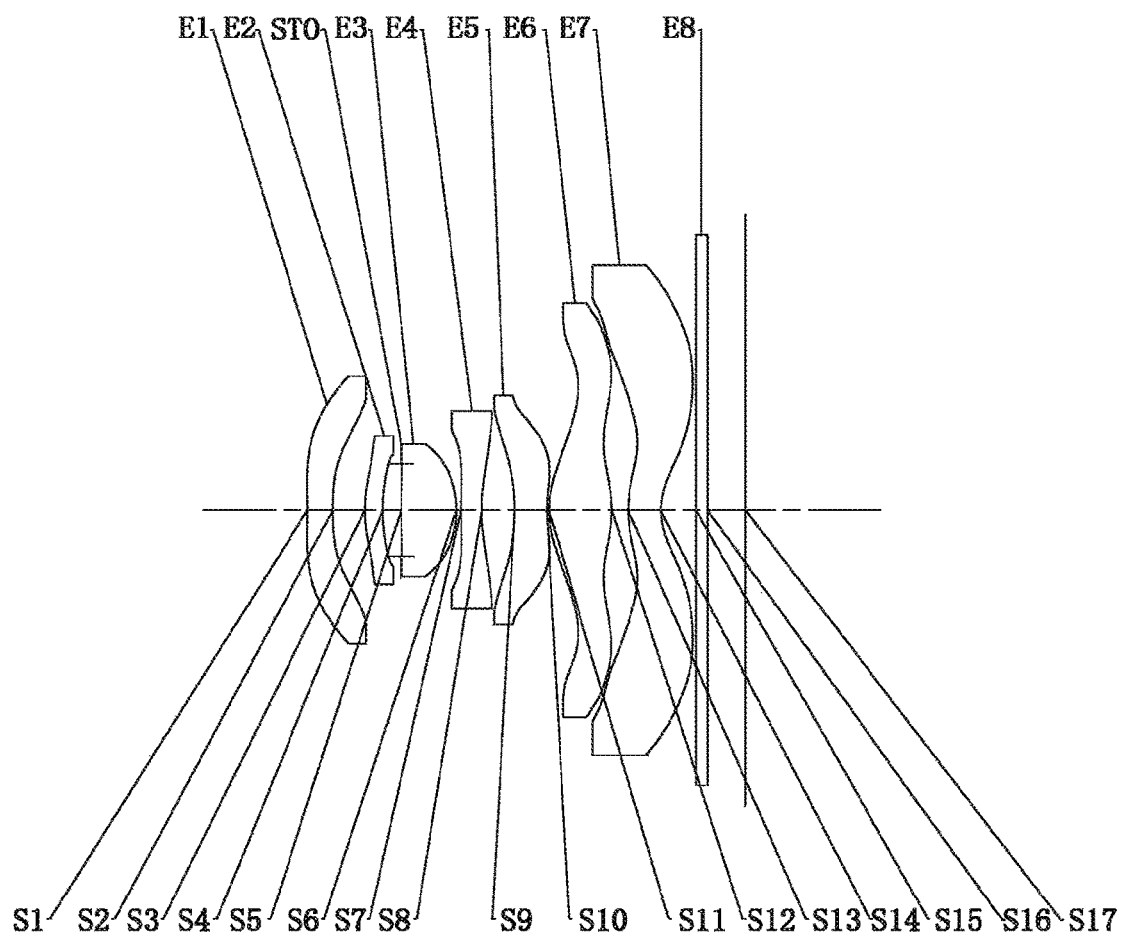
FIG. 1 illustrates a schematic structural view of an optical imaging lens assembly according to example 1 of the present disclosure.

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first lens discussed below may also be referred to as a second lens or a third lens without departing from the teachings of the present disclosure.

In the accompanying drawings, the thickness, size and shape of the lens have been somewhat exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is convex and the position of the convex is not defined, it indicates that the surface of the lens is convex at least in the paraxial region; and if a surface of a lens is concave and the position of the concave is not defined, it indicates that the surface of the lens is concave at least in the paraxial region. In each lens, the surface closest to the object is referred to as an object-side surface of the lens, and the surface closest to the imaging plane is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples.

The features, principles, and other aspects of the present disclosure are described in detail below.

An optical imaging lens assembly according to an exemplary embodiment of the present disclosure may include, for example, seven lenses having refractive power. The seven lenses are a first lens, a second lens, a third lens, a fourth lens, a fifth lens, a sixth lens and a seventh lens. The seven lenses are arranged sequentially from an object side to an image side along an optical axis. Among the first lens to the seventh lens, there may be an air interval between each two adjacent lenses.

In an exemplary embodiment, the first lens has negative refractive power; the second lens may have positive or negative refractive power; the fourth lens may have positive or negative refractive power, an object-side surface thereof may be convex, and an image-side surface thereof may be concave; and the fifth lens may have positive or negative refractive power. As an example, the third lens may have positive or negative refractive power. As an example, the sixth lens may have positive or negative refractive power. As an example, the seventh lens may have positive or negative refractive power. By rationally controlling the positive or negative refractive power of the refractive power and the surface curvature of each component of the lens assembly, the aberration of the optical imaging lens assembly may be effectively compensated, so that the optical imaging lens assembly has a better imaging effect.

In an exemplary embodiment, an object-side surface of the fifth lens may be concave.

In an exemplary embodiment, an object-side surface of the seventh lens may be convex, and an image-side surface thereof may be concave.

In an exemplary embodiment, the above optical imaging lens assembly may further include at least one stop. The stop may be disposed at an appropriate position as required, for example, between the second lens and the third lens. Optionally, the above optical imaging lens assembly may further include an optical filter for correcting the color deviation and/or a protective glass for protecting the photosensitive element located on an imaging plane.

In an exemplary embodiment, the optical imaging lens assembly according to the present disclosure may satisfy: ImgH≥5.20 mm, where ImgH is half of a diagonal length of an effective pixel area on an imaging plane of the optical imaging lens assembly. By controlling the image height, the optical imaging lens assembly may be characterized by high pixels, and the resolution of the optical imaging lens assembly may be effectively improved. More specifically, ImgH may satisfy: 5.20 mm≤ImgH≤5.40 mm.

In an exemplary embodiment, the optical imaging lens assembly according to the present disclosure may satisfy: 5 mm<f*tan(Semi-FOV)<7 mm, where f is a total effective focal length of the optical imaging lens assembly, and Semi-FOV is half of a maximum field-of-view of the optical imaging lens assembly. By controlling the conditional expression, the refractive power of the lenses may be reasonably assigned, and the optical imaging lens assembly may have a larger image plane, thereby improving the resolution of the imaging lens assembly. More specifically, f and Semi-FOV may satisfy: 5.60 mm<f*tan(Semi-FOV)<6.20 mm.

In an exemplary embodiment, the optical imaging lens assembly according to the present disclosure may satisfy: 110°<FOV<130°, where FOV is a maximum field-of-view of the optical imaging lens assembly. By controlling the conditional expression, it is beneficial to enable the optical imaging lens assembly to have a larger field-of-view, which in turn is beneficial to increase the imaging range of the optical imaging lens assembly. More specifically, FOV may satisfy: 115°<FOV<125°.

In an exemplary embodiment, the optical imaging lens assembly according to the present disclosure may satisfy: TTL/ImgH<1.55, where TTL is a distance along the optical axis from an object-side surface of the first lens to an imaging plane, and ImgH is half of a diagonal length of an effective pixel area on the imaging plane. By controlling the ratio of the total optical length to the image height of the optical imaging lens assembly, it is beneficial to make the optical imaging lens assembly structure compact and maintain the miniaturization of the optical imaging lens assembly, so that the optical imaging lens assembly may have a better market prospect. More specifically, TTL and ImgH may satisfy: $1.40<\text{TTL/ImgH}<1.54$.

In an exemplary embodiment, the optical imaging lens assembly according to the present disclosure may satisfy: $|f7/R13|<1.7$, where f7 is an effective focal length of the seventh lens, and R13 is a radius of curvature of an object-side surface of the seventh lens. By controlling the absolute value of the ratio between the effective focal length of the seventh lens and the radius of curvature thereof, the shape of the seventh lens may be effectively controlled, thereby effectively controlling the deflection of the incident light of the optical imaging lens assembly at the seventh lens. Moreover, the seventh lens may obtain better manufacturability, and the optical imaging lens assembly may have better aberration correction ability. More specifically, f7 and R13 may satisfy: $0.8<|f7/R13|<1.7$.

In an exemplary embodiment, the optical imaging lens assembly according to the present disclosure may satisfy: $1.5<(R7+R8)/R8<4.1$, where R7 is a radius of curvature of the object-side surface of the fourth lens, and R8 is a radius of curvature of the image-side surface of the fourth lens. By controlling the conditional expression, the shape of the fourth lens may be effectively controlled, so the refraction angle of the incident light of the optical imaging lens assembly at the fourth lens is controlled. The optical imaging lens assembly may have good processability. By controlling the conditional expression, it is also conducive to better matching the optical imaging lens assembly with the chip. More specifically, R7 and R8 may satisfy: $1.90<(R7+R8)/R8<4.05$.

In an exemplary embodiment, the optical imaging lens assembly according to the present disclosure may satisfy: $2.0<|f/f6|+|f/f7|<3.5$, where f is a total effective focal length of the optical imaging lens assembly, f6 is an effective focal length of the sixth lens, and f7 is an effective focal length of the seventh lens. By controlling the conditional expression, it is beneficial to constrain the effective focal length of the sixth lens and the effective focal length of the seventh lens. By reasonably configuring the refractive power of the adjacent sixth lens and seventh lens, the astigmatic and curvature of field generated by the lenses located at the image side of the two lenses may be effectively compensated, thereby improving the image quality of the optical imaging system. More specifically, f, f6 and f7 may satisfy: $2.0<|f/f6|+|f/f7|<3.2$.

In an exemplary embodiment, the optical imaging lens assembly according to the present disclosure may satisfy: $4.5<(CT1+CT2+CT3)/T23<7.5$, where CT1 is a center thickness of the first lens along the optical axis, CT2 is a center thickness of the second lens along the optical axis, CT3 is a center thickness of the third lens along the optical axis, and T23 is a spaced interval between the second lens and the third lens along the optical axis. By controlling the conditional expression, the center thicknesses of the front three lenses and the air interval between the second lens and the third lens may be effectively controlled, and the contribution of the front three lenses to the curvature of field of the optical imaging lens assembly may be reduced, so that the optical imaging lens assembly has better image quality. More specifically, CT1, CT2, CT3 and T23 may satisfy: $4.80<(CT1+CT2+CT3)/T23<7.40$.

In an exemplary embodiment, the optical imaging lens assembly according to the present disclosure may satisfy: $0.5<R7/f<3.5$, where R7 is a radius of curvature of the object-side surface of the fourth lens, and f is a total effective focal length of the optical imaging lens assembly. By controlling the ratio of the radius of curvature of the object-side surface of the fourth lens to the total effective focal length in a certain range, the contribution of the fourth lens to the spherical aberration of the lens assembly may be controlled, so that the lens assembly has a smaller spherical aberration, thereby improving the imaging effect of the lens assembly. More specifically, R7 and f may satisfy: $0.90<R7/f<3.49$.

In an exemplary embodiment, the optical imaging lens assembly according to the present disclosure may satisfy: $-2<\text{SAG11/SAG71}<0$, where SAG11 is an on-axis distance from an intersection of an object-side surface of the first lens and the optical axis to a vertex of an effective radius of the object-side surface of the first lens, and SAG71 is an on-axis distance from an intersection of an object-side surface of the seventh lens and the optical axis to a vertex of an effective radius of the object-side surface of the seventh lens. By controlling the ratio of the sagittal height of the object-side surface of the first lens to the sagittal height of the object-side surface of the seventh lens, the shape of the first lens and the seventh lens may be effectively controlled, the processability of the two lenses may be improved, and the light travelling direction at the edge field-of-view may be effectively controlled to make the optical imaging lens assembly better match with the chip. More specifically, SAG11 and SAG71 may satisfy: $-1.50<\text{SAG11/SAG71}<-0.90$.

In an exemplary embodiment, the optical imaging lens assembly according to the present disclosure may satisfy: $-1.0<\text{ET3/SAG32}<-0.5$, where ET3 is an edge thickness of the third lens in a direction parallel to the optical axis, and SAG32 is an on-axis distance from an intersection of an image-side surface of the third lens and the optical axis to a vertex of an effective radius of the image-side surface of the third lens. By controlling the ratio of the edge thickness of the third lens and the sagittal height of the image-side surface of the third lens, the shape of the third lens may be effectively controlled. More specifically, ET3 and SAG32 may satisfy: $-0.98<\text{ET3/SAG32}<-0.70$.

In an exemplary embodiment, the optical imaging lens assembly according to the present disclosure may satisfy: $1.0<\text{f234/f}<2.0$, where f234 is a combined focal length of the second lens, the third lens, and the fourth lens, and f is a total effective focal length of the optical imaging lens assembly. By controlling the conditional expression, the spherical aberration contributed by the second lens, the third lens and the fourth lens may be effectively controlled, so that the on-axis field-of-view of the optical imaging lens assembly may obtain good image quality. More specifically, f234 and f may satisfy: $1.20<\text{f234/f}<1.80$.

In an exemplary embodiment, the optical imaging lens assembly according to the present disclosure may satisfy: $1.0 \text{ mm}<\text{ET7}<1.5 \text{ mm}$, where ET7 is an edge thickness of the seventh lens in a direction parallel to the optical axis. By controlling the conditional expression, the shape of the seventh lens may be effectively controlled, and the workability thereof may be ensured to facilitate the molding and assembly thereof. Further, the imaging effect of the optical imaging system is improved. More specifically, ET7 may satisfy: $1.03 \text{ mm}<\text{ET7}<1.30 \text{ mm}$.

The optical imaging lens assembly according to the above embodiments of the present disclosure may employ a plurality of lenses, such as seven lenses as described above. By properly configuring the refractive power of each lens, the surface shape, the center thickness of each lens, and spaced intervals along the optical axis between the lenses, the size and the sensitivity of the imaging lens assembly may be effectively reduced, and the workability of the imaging lens assembly may be improved, such that the optical imaging lens assembly is more advantageous for production processing and may be applied to portable electronic products. At the same time, the optical imaging lens assembly of the present disclosure also has excellent optical performance, such as large image plane, large wide angle, high pixels, high resolution or high image quality.

In the embodiments of the present disclosure, at least one of the surfaces of lenses is aspheric, that is, at least one of the object-side surface of the first lens to the image-side surface of the seventh lens is aspheric. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. With aspheric lens, the aberrations that occur during imaging may be eliminated as much as possible, and thus improving the image quality. Optionally, at least one of the object-side surface and the image-side surface of each of the first lens, the second lens, the third lens, the fourth lens, the fifth lens, the sixth lens and the seventh lens is aspheric. Optionally, the object-side surface and the image-side surface of each of the first lens, the second lens, the third lens, the fourth lens, the fifth lens, the sixth lens and the seventh lens are aspheric.

However, it will be understood by those skilled in the art that the number of lenses constituting the optical imaging lens assembly may be varied to achieve the various results and advantages described in this specification without departing from the technical solution claimed by the present disclosure. For example, although the embodiment is described by taking seven lenses as an example, the optical imaging lens assembly is not limited to include seven lenses. The optical imaging lens assembly may also include other numbers of lenses if desired.

Some specific examples of an optical imaging lens assembly applicable to the above embodiment will be further described below with reference to the accompanying drawings.

Example 1

An optical imaging lens assembly according to example 1 of the present disclosure is described below with reference to FIG. 1 to FIG. 2C. FIG. 1 shows a schematic structural view of the optical imaging lens assembly according to example 1 of the present disclosure.

As shown in FIG. 1, the optical imaging lens assembly includes a first lens E1, a second lens E2, a stop STO, a third lens E3, a fourth lens E4, a fifth lens E5, a sixth lens E6, a seventh lens E7 and an optical filter E8, which are sequentially arranged from an object side to an image side along an optical axis.

The first lens E1 has negative refractive power, an object-side surface S1 thereof is concave, and an image-side surface S2 thereof is concave. The second lens E2 has positive refractive power, an object-side surface S3 thereof is convex, and an image-side surface S4 thereof is concave. The third lens E3 has positive refractive power, an object-side surface S5 thereof is convex, and an image-side surface S6 thereof is convex. The fourth lens E4 has negative refractive power, an object-side surface S7 thereof is convex, and an image-side surface S8 thereof is concave. The fifth lens E5 has negative refractive power, an object-side surface S9 thereof is concave, and an image-side surface S10 thereof is concave. The sixth lens E6 has positive refractive power, an object-side surface S11 thereof is convex, and an image-side surface S12 thereof is convex. The seventh lens E7 has negative refractive power, an object-side surface S13 thereof is convex, and an image-side surface S14 thereof is concave. The optical filter E8 has an object-side surface S15 and an image-side surface S16. The optical imaging lens assembly has an imaging plane S17, and light from an object sequentially passes through the respective surfaces S1 to S16 and is finally imaged on the imaging plane S17.

Table 1 is a table illustrating basic parameters of the optical imaging lens assembly of example 1, wherein the units for the radius of curvature, the thickness/distance and the focal length are millimeter (mm).

TABLE 1

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Aspheric | −12.8012 | 0.4595 | 1.54 | 55.8 | −9.52 | 0.0000 |
| S2 | Aspheric | 8.6186 | 0.5759 | | | | 0.0000 |
| S3 | Aspheric | 2.8276 | 0.3229 | 1.57 | 37.3 | 20.79 | 0.0000 |
| S4 | Aspheric | 3.5589 | 0.3239 | | | | 0.0000 |
| STO | Spherical | Infinite | 0.0075 | | | | |
| S5 | Aspheric | 20.3866 | 0.9905 | 1.54 | 55.8 | 3.14 | −99.0000 |
| S6 | Aspheric | −1.8079 | 0.0835 | | | | 0.0000 |
| S7 | Aspheric | 9.5401 | 0.3730 | 1.67 | 20.4 | −8.10 | 0.0000 |
| S8 | Aspheric | 3.3956 | 0.5913 | | | | 0.0000 |
| S9 | Aspheric | −3.8080 | 0.5835 | 1.54 | 55.8 | −2.89 | 0.0000 |
| S10 | Aspheric | 2.7516 | 0.0350 | | | | 0.0000 |
| S11 | Aspheric | 1.6561 | 1.1410 | 1.55 | 56.1 | 1.83 | −1.0000 |
| S12 | Aspheric | −1.9007 | 0.2927 | | | | −1.0000 |
| S13 | Aspheric | 2.2756 | 0.5800 | 1.65 | 23.5 | −3.81 | −1.0752 |
| S14 | Aspheric | 1.0631 | 0.6381 | | | | −1.0000 |
| S15 | Spherical | Infinite | 0.2100 | 1.51 | 64.2 | | |
| S16 | Spherical | Infinite | 0.6814 | | | | |
| S17 | Spherical | Infinite | | | | | |

In example 1, a total effective focal length f of the optical imaging lens assembly is 3.36 mm, an aperture number Fno of the optical imaging lens assembly is 2.27, a distance TTL along the optical axis from the object-side surface S1 of the first lens E1 to the imaging plane S17 is 7.89 mm, half of a diagonal length ImgH of an effective pixel area on the imaging plane S17 is 5.35 mm, and half of a maximum field-of-view Semi-FOV is 61.42°.

In example 1, the object-side surface and the image-side surface of any one of the first lens E1 to the seventh lens E7 are aspheric. The surface shape x of each aspheric lens may be defined by using, but not limited to, the following aspheric formula:

$$x = \frac{ch^2}{1+\sqrt{1-(k+1)c^2h^2}} + \sum A_i h^i \quad (1)$$

Where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient; Ai is a correction coefficient for the i-th order of the aspheric surface. Table 2 below shows high-order coefficients A4, A6, A8, A10, A12, A14, A16, A18 and A20 applicable to each aspheric surface S1 to S14 in example 1.

Figure 2A:
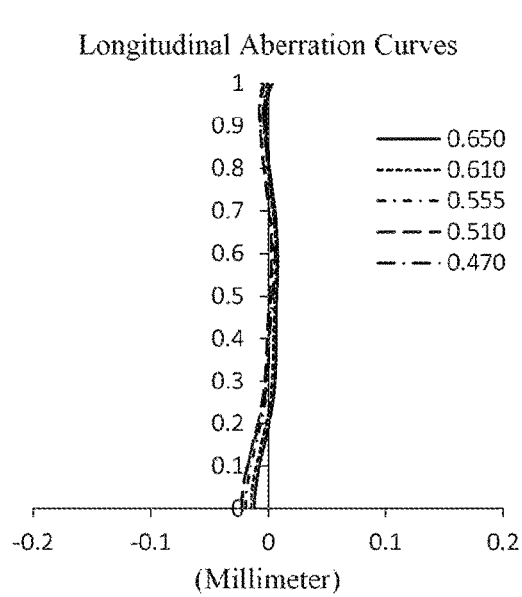
FIGS. 2A to 2C illustrate longitudinal aberration curves, astigmatic curves, and a lateral color curve of the optical imaging lens assembly of the example 1, respectively.
Figure 2B:
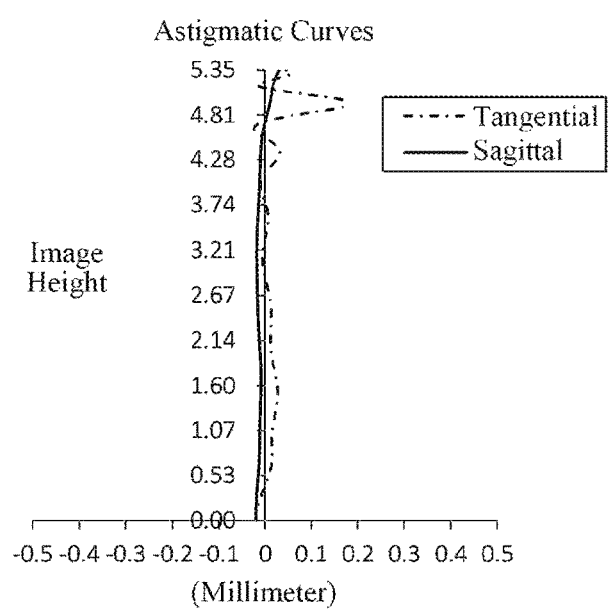
Figure 2C:
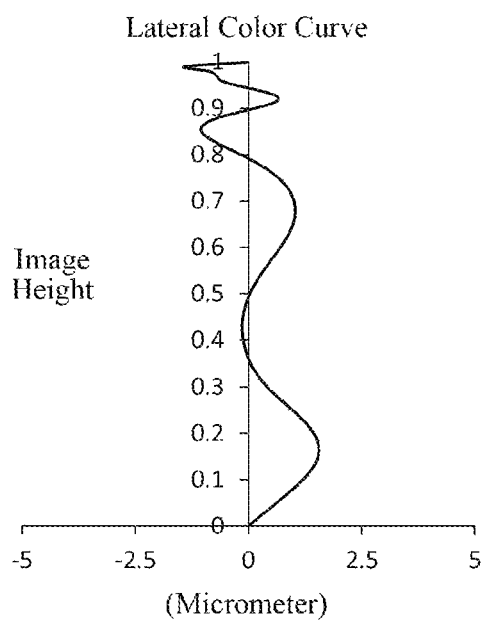

FIG. 2A illustrates longitudinal aberration curves of the optical imaging lens assembly according to example 1, representing the deviations of focal points converged by light of different wavelengths after passing through the lens assembly. FIG. 2B illustrates astigmatic curves of the optical imaging lens assembly according to example 1, representing the curvatures of a tangential plane and the curvatures of a sagittal plane. FIG. 2C illustrates a lateral color curve of the optical imaging lens assembly according to example 1, representing the deviations of different image heights on an imaging plane after light passes through the lens assembly. It can be seen from FIG. 2A to FIG. 2C that the optical imaging lens assembly provided in example 1 may achieve good image quality.

Example 2

Figure 3:
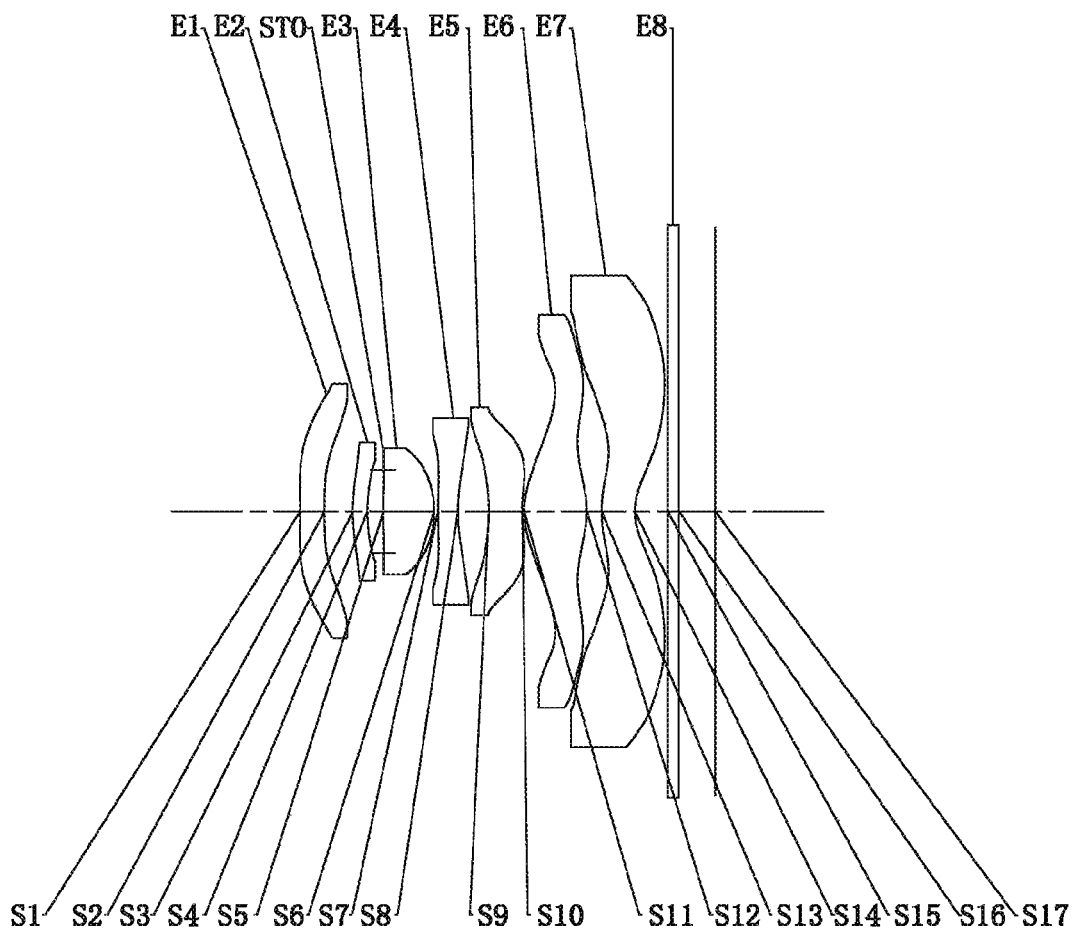
FIG. 3 illustrates a schematic structural view of an optical imaging lens assembly according to example 2 of the present disclosure.

An optical imaging lens assembly according to example 2 of the present disclosure is described below with reference to FIG. 3 to FIG. 4C. In this example and the following examples, for the purpose of brevity, the description of parts similar to those in example 1 will be omitted. FIG. 3 shows a schematic structural view of the optical imaging lens assembly according to example 2 of the present disclosure.

As shown in FIG. 3, the optical imaging lens assembly includes a first lens E1, a second lens E2, a stop STO, a third lens E3, a fourth lens E4, a fifth lens E5, a sixth lens E6, a seventh lens E7 and an optical filter E8, which are sequentially arranged from an object side to an image side along an optical axis.

The first lens E1 has negative refractive power, an object-side surface S1 thereof is concave, and an image-side surface S2 thereof is concave. The second lens E2 has negative refractive power, an object-side surface S3 thereof is convex, and an image-side surface S4 thereof is concave. The third lens E3 has positive refractive power, an object-side surface S5 thereof is convex, and an image-side surface S6 thereof is convex. The fourth lens E4 has negative refractive power, an object-side surface S7 thereof is convex, and an image-side surface S8 thereof is concave. The fifth lens E5 has negative refractive power, an object-side surface S9 thereof is concave, and an image-side surface S10 thereof is concave. The sixth lens E6 has positive refractive

TABLE 2

| Surface number | A4 | A6 | A8 | A10 | A12 |
|---|---|---|---|---|---|
| S1 | 9.4177E−02 | −4.4775E−02 | 1.9864E−02 | −6.6808E−03 | 1.5422E−03 |
| S2 | 1.2333E−01 | −5.8459E−02 | 1.4801E−02 | 9.5588E−03 | −1.4816E−02 |
| S3 | −2.2581E−03 | −6.5514E−02 | 2.7242E−02 | 8.0373E−03 | −1.1096E−01 |
| S4 | 3.2909E−02 | −2.9585E−01 | 1.8302E+00 | −7.6161E+00 | 1.9872E+01 |
| S5 | −8.1474E−03 | 3.2979E−02 | −4.1731E−01 | 1.9894E+00 | −5.8949E+00 |
| S6 | −6.2727E−02 | 1.2215E−01 | −2.1841E−01 | 2.0078E−01 | −9.4155E−01 |
| S7 | −1.2437E−01 | 1.5099E−01 | −2.5987E−01 | 3.6091E−01 | −3.6217E−01 |
| S8 | −7.3321E−02 | 3.7386E−02 | −2.2649E−02 | 1.4817E−02 | −8.7661E−03 |
| S9 | −3.1664E−03 | −1.6158E−02 | 8.6227E−02 | −1.8257E−01 | 2.3222E−01 |
| S10 | −2.3277E−01 | 3.9139E−02 | 5.8745E−02 | −9.0865E−02 | 6.8815E−02 |
| S11 | −1.3266E−01 | 7.6331E−02 | −3.5839E−02 | 1.2299E−02 | −3.2086E−03 |
| S12 | 1.8345E−01 | −8.0333E−02 | 3.2970E−02 | −1.1513E−02 | 2.9783E−03 |
| S13 | −2.6776E−02 | −8.8519E−02 | 6.5431E−02 | −2.5438E−02 | 6.5235E−03 |
| S14 | −2.1471E−01 | 7.5939E−02 | −2.1363E−02 | 4.6812E−03 | −7.8879E−04 |

| Surface number | A14 | A16 | A18 | A20 |
|---|---|---|---|---|
| S1 | −2.2111E−04 | 1.5733E−05 | −1.2310E−08 | −4.7739E−08 |
| S2 | 7.7166E−03 | −2.0128E−03 | 2.6518E−04 | −1.4115E−05 |
| S3 | 1.9251E−01 | −1.3984E−01 | 4.7670E−02 | −6.3434E−03 |
| S4 | −3.2490E+01 | 3.2469E+01 | −1.8096E+01 | 4.3194E+00 |
| S5 | 1.0969E+01 | −1.2516E+01 | 8.0166E+00 | −2.2137E+00 |
| S6 | −2.5174E−01 | 3.2155E−01 | −1.7671E−01 | 3.7447E−02 |
| S7 | 2.4142E−01 | −9.9424E−02 | 2.2468E−02 | −2.0806E−03 |
| S8 | 3.8141E−03 | −1.0631E−03 | 1.6483E−04 | −1.0655E−05 |
| S9 | −2.0077E−01 | 1.2370E−01 | −5.4163E−02 | 1.6336E−02 |
| S10 | −3.1765E−02 | 8.6923E−03 | −1.0323E−03 | −1.1609E−04 |
| S11 | 6.3858E−04 | −9.4336E−05 | 9.9559E−06 | −7.1850E−07 |
| S12 | −5.4712E−04 | 7.0810E−05 | −6.4111E−06 | 3.9787E−07 |
| S13 | −1.1684E−03 | 1.4787E−04 | −1.3111E−05 | 7.9400E−07 |
| S14 | 1.0063E−04 | −9.5367E−06 | 6.5445E−07 | −3.1335E−08 | power, an object-side surface S11 thereof is convex, and an image-side surface S12 thereof is convex. The seventh lens E7 has negative refractive power, an object-side surface S13 thereof is convex, and an image-side surface S14 thereof is concave. The optical filter E8 has an object-side surface S15 and an image-side surface S16. The optical imaging lens assembly has an imaging plane S17, and light from an object sequentially passes through the respective surfaces S1 to S16 and is finally imaged on the imaging plane S17.

In example 2, a total effective focal length f of the optical imaging lens assembly is 3.36 mm, an aperture number Fno of the optical imaging lens assembly is 2.27, a distance TTL along the optical axis from the object-side surface S1 of the first lens E1 to the imaging plane S17 is 7.79 mm, half of a diagonal length ImgH of an effective pixel area on the imaging plane S17 is 5.35 mm, and half of a maximum field-of-view Semi-FOV is 61.14°.

Table 3 is a table illustrating basic parameters of the optical imaging lens assembly of example 2, wherein the units for the radius of curvature, the thickness/distance and the focal length are millimeter (mm). Table 4 shows high-order coefficients applicable to each aspheric surface in example 2, wherein the surface shape of each aspheric surface may be defined by the formula (1) given in the above example 1.

TABLE 3

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Aspheric | −12.8012 | 0.4595 | 1.54 | 55.8 | −23.32 | 16.6395 |
| S2 | Aspheric | 573.5824 | 0.5315 | | | | −99.0000 |
| S3 | Aspheric | 4.2204 | 0.2729 | 1.57 | 37.3 | −50.00 | 2.6895 |
| S4 | Aspheric | 3.5900 | 0.2907 | | | | 2.0506 |
| STO | Spherical | Infinite | 0.0114 | | | | |
| S5 | Aspheric | 20.1159 | 0.9521 | 1.54 | 55.8 | 3.22 | 23.9891 |
| S6 | Aspheric | −1.8567 | 0.0719 | | | | 0.0088 |
| S7 | Aspheric | 8.3792 | 0.3730 | 1.67 | 20.4 | −8.12 | 17.0119 |
| S8 | Aspheric | 3.2304 | 0.5821 | | | | −0.0505 |
| S9 | Aspheric | −4.0292 | 0.6219 | 1.54 | 55.8 | −2.87 | 0.2328 |
| S10 | Aspheric | 2.6293 | 0.0408 | | | | −0.0778 |
| S11 | Aspheric | 1.5594 | 1.1758 | 1.55 | 56.1 | 1.74 | −1.0023 |
| S12 | Aspheric | −1.7726 | 0.2803 | | | | −1.0257 |
| S13 | Aspheric | 2.6256 | 0.6209 | 1.65 | 23.5 | −3.46 | −0.9443 |
| S14 | Aspheric | 1.0944 | 0.6184 | | | | −0.9976 |
| S15 | Spherical | Infinite | 0.2100 | 1.51 | 64.2 | | |
| S16 | Spherical | Infinite | 0.6814 | | | | |
| S17 | Spherical | Infinite | | | | | |

TABLE 4

| Surface number | A4 | A6 | A8 | A10 | A12 |
|---|---|---|---|---|---|
| S1 | 9.0884E−02 | −4.1240E−02 | 1.9418E−02 | −7.0077E−03 | 1.6270E−03 |
| S2 | 1.3097E−01 | −8.6771E−02 | 6.6846E−02 | −4.5656E−02 | 2.0058E−02 |
| S3 | 2.7927E−02 | −1.4556E−01 | 2.7262E−01 | −5.3682E−01 | 7.1816E−01 |
| S4 | 2.5777E−02 | −3.8371E−02 | −4.3207E−02 | −1.2382E−01 | 1.6470E+00 |
| S5 | −1.0233E−02 | 5.5022E−02 | −7.2259E−01 | 3.6078E+00 | −1.0580E+01 |
| S6 | −3.6314E−02 | −1.9646E−02 | 2.5905E−01 | −8.8085E−01 | 1.6367E+00 |
| S7 | −9.5861E−02 | 3.2807E−02 | 2.2572E−02 | −5.0955E−02 | 2.0860E−02 |
| S8 | −6.1951E−02 | −1.6116E−03 | 4.0166E−02 | −4.4052E−02 | 2.5353E−02 |
| S9 | 7.1194E−03 | −9.7819E−03 | 1.0832E−02 | −2.6763E−02 | 4.8580E−02 |
| S10 | −2.1678E−01 | −1.8220E−02 | 1.9732E−01 | −3.4727E−01 | 3.8702E−01 |
| S11 | −1.2979E−01 | 6.9373E−02 | −3.2151E−02 | 1.2296E−02 | −4.0808E−03 |
| S12 | 2.0382E−01 | −1.0980E−01 | 5.2402E−02 | −1.8255E−02 | 4.2633E−03 |
| S13 | −6.2422E−03 | −1.0482E−01 | 6.2872E−02 | −1.8170E−02 | 3.0231E−03 |
| S14 | −2.0716E−01 | 7.4219E−02 | −2.3676E−02 | 6.3921E−03 | −1.3188E−03 |

| Surface number | A14 | A16 | A18 | A20 |
|---|---|---|---|---|
| S1 | −2.1107E−04 | 8.9365E−06 | 9.9243E−07 | −9.9011E−08 |
| S2 | −5.4370E−03 | 8.9507E−04 | −8.2909E−05 | 3.3322E−06 |
| S3 | −5.9036E−01 | 2.9431E−01 | −8.2112E−02 | 9.8259E−03 |
| S4 | −4.8631E+00 | 7.0859E+00 | −5.2372E+00 | 1.5855E+00 |
| S5 | 1.8556E+01 | −1.9000E+01 | 1.0304E+01 | −2.2137E+00 |
| S6 | −1.9165E+00 | 1.3918E+00 | −5.7203E−01 | 1.0118E−01 |
| S7 | 1.6038E−02 | −1.8828E−02 | 6.7786E−03 | −8.5364E−04 |
| S8 | −8.4661E−03 | 1.5684E−03 | −1.3468E−04 | 2.4600E−06 |
| S9 | −6.0302E−02 | 5.1470E−02 | −2.8855E−02 | 1.0279E−02 |
| S10 | −2.9885E−01 | 1.6259E−01 | −6.2049E−02 | 1.6256E−02 |
| S11 | 1.0812E−03 | −2.0712E−04 | 2.7146E−05 | −2.3490E−06 |
| S12 | −6.6096E−04 | 6.7399E−05 | −4.3495E−06 | 1.5794E−07 |
| S13 | −2.8751E−04 | 1.1459E−05 | 6.0001E−07 | −1.0681E−07 |
| S14 | 1.9582E−04 | −2.0447E−05 | 1.4795E−06 | −7.2404E−08 |

Figure 4A:
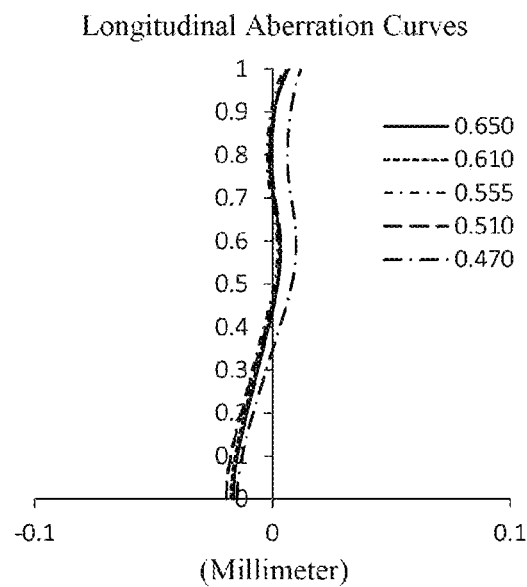
FIGS. 4A to 4C illustrate longitudinal aberration curves, astigmatic curves, and a lateral color curve of the optical imaging lens assembly of the example 2, respectively.
Figure 4B:
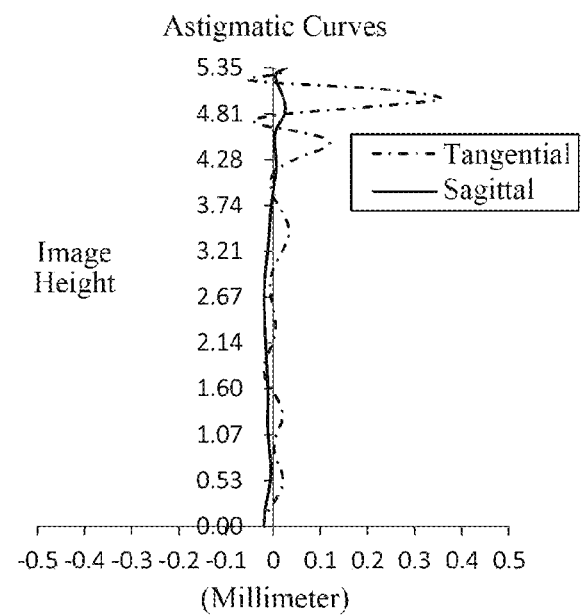
Figure 4C:
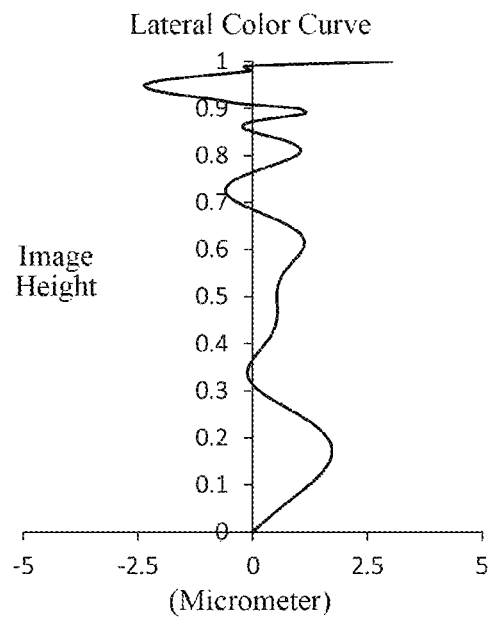

FIG. 4A illustrates longitudinal aberration curves of the optical imaging lens assembly according to example 2, representing the deviations of focal points converged by light of different wavelengths after passing through the lens assembly. FIG. 4B illustrates astigmatic curves of the optical imaging lens assembly according to example 2, representing the curvatures of a tangential plane and the curvatures of a sagittal plane. FIG. 4C illustrates a lateral color curve of the optical imaging lens assembly according to example 2, representing the deviations of different image heights on an imaging plane after light passes through the lens assembly. It can be seen from FIG. 4A to FIG. 4C that the optical imaging lens assembly provided in example 2 may achieve good image quality.

Example 3

Figure 5:
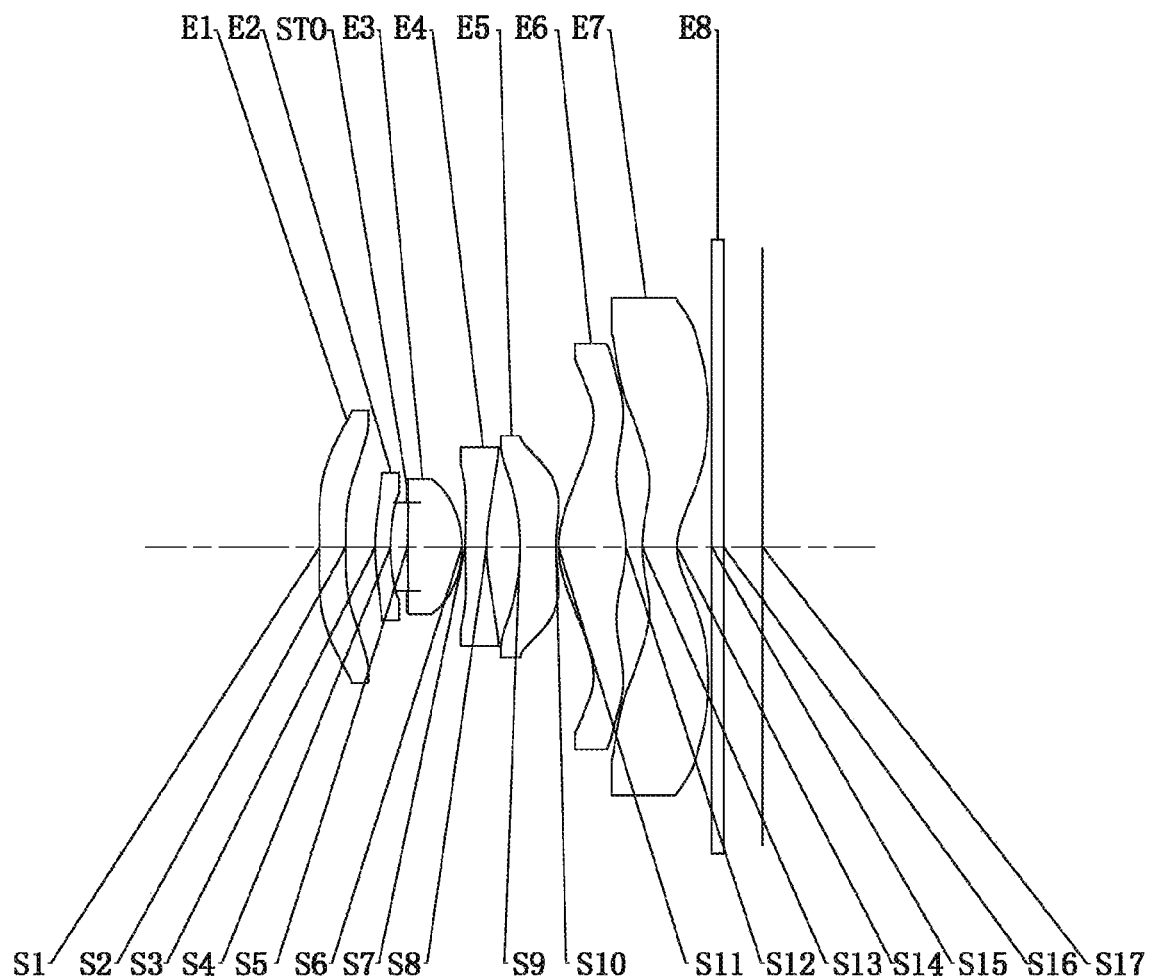
FIG. 5 illustrates a schematic structural view of an optical imaging lens assembly according to example 3 of the present disclosure.

An optical imaging lens assembly according to example 3 of the present disclosure is described below with reference to FIG. 5 to FIG. 6C. FIG. 5 shows a schematic structural view of the optical imaging lens assembly according to example 3 of the present disclosure.

As shown in FIG. 5, the optical imaging lens assembly includes a first lens E1, a second lens E2, a stop STO, a third lens E3, a fourth lens E4, a fifth lens E5, a sixth lens E6, a seventh lens E7 and an optical filter E8, which are sequentially arranged from an object side to an image side along an optical axis.

The first lens E1 has negative refractive power, an object-side surface S1 thereof is concave, and an image-side surface S2 thereof is convex. The second lens E2 has negative refractive power, an object-side surface S3 thereof is convex, and an image-side surface S4 thereof is concave. The third lens E3 has positive refractive power, an object-side surface S5 thereof is convex, and an image-side surface S6 thereof is convex. The fourth lens E4 has negative refractive power, an object-side surface S7 thereof is convex, and an image-side surface S8 thereof is concave. The fifth lens E5 has negative refractive power, an object-side surface S9 thereof is concave, and an image-side surface S10 thereof is concave. The sixth lens E6 has positive refractive power, an object-side surface S11 thereof is convex, and an image-side surface S12 thereof is convex. The seventh lens E7 has negative refractive power, an object-side surface S13 thereof is convex, and an image-side surface S14 thereof is concave. The optical filter E8 has an object-side surface S15 and an image-side surface S16. The optical imaging lens assembly has an imaging plane S17, and light from an object sequentially passes through the respective surfaces S1 to S16 and is finally imaged on the imaging plane S17.

In example 3, a total effective focal length f of the optical imaging lens assembly is 3.36 mm, an aperture number Fno of the optical imaging lens assembly is 2.27, a distance TTL along the optical axis from the object-side surface S1 of the first lens E1 to the imaging plane S17 is 7.78 mm, half of a diagonal length ImgH of an effective pixel area on the imaging plane S17 is 5.20 mm, and half of a maximum field-of-view Semi-FOV is 59.90°.

Table 5 is a table illustrating basic parameters of the optical imaging lens assembly of example 3, wherein the units for the radius of curvature, the thickness/distance and the focal length are millimeter (mm). Table 6 shows high-order coefficients applicable to each aspheric surface in example 3, wherein the surface shape of each aspheric surface may be defined by the formula (1) given in the above example 1.

TABLE 5

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Aspheric | −12.8012 | 0.4595 | 1.54 | 55.8 | −28.46 | 18.0703 |
| S2 | Aspheric | −80.0000 | 0.5179 | | | | −87.4559 |
| S3 | Aspheric | 4.6078 | 0.2689 | 1.57 | 37.3 | −35.02 | 4.0484 |
| S4 | Aspheric | 3.6647 | 0.2880 | | | | 2.5890 |
| STO | Spherical | Infinite | 0.0105 | | | | |
| S5 | Aspheric | 19.0120 | 0.9549 | 1.54 | 55.8 | 3.20 | 18.5606 |
| S6 | Aspheric | −1.8556 | 0.0615 | | | | −0.0022 |
| S7 | Aspheric | 8.4007 | 0.3730 | 1.67 | 20.4 | −8.04 | 18.1336 |
| S8 | Aspheric | 3.2164 | 0.5874 | | | | 0.0109 |
| S9 | Aspheric | −4.0255 | 0.6326 | 1.54 | 55.8 | −2.86 | 0.2162 |
| S10 | Aspheric | 2.6112 | 0.0422 | | | | −0.0858 |
| S11 | Aspheric | 1.5316 | 1.1850 | 1.55 | 56.1 | 1.73 | −1.0003 |
| S12 | Aspheric | −1.7844 | 0.2893 | | | | −1.0181 |
| S13 | Aspheric | 2.6717 | 0.6131 | 1.65 | 23.5 | −3.44 | −0.9186 |
| S14 | Aspheric | 1.1035 | 0.6064 | | | | −0.9965 |
| S15 | Spherical | Infinite | 0.2100 | 1.51 | 64.2 | | |
| S16 | Spherical | Infinite | 0.6814 | | | | |
| S17 | Spherical | Infinite | | | | | |

TABLE 6

| Surface number | A4 | A6 | A8 | A10 | A12 |
|---|---|---|---|---|---|
| S1 | 8.6372E−02 | −3.6093E−02 | 1.4961E−02 | −4.4540E−03 | 6.9130E−04 |
| S2 | 1.2978E−01 | −8.8215E−02 | 6.8728E−02 | −4.6631E−02 | 2.0414E−02 |
| S3 | 3.1737E−02 | −1.4463E−01 | 2.7588E−01 | −5.5456E−01 | 7.6798E−01 |
| S4 | −4.4962E−03 | 3.6370E−01 | −2.6955E+00 | 1.0388E+01 | −2.4366E+01 |
| S5 | −9.6047E−03 | 1.5105E−02 | −3.0786E−01 | 1.5653E+00 | −5.0882E+00 |

TABLE 6-continued

| | | | | | |
|---|---|---|---|---|---|
| S6 | −3.7276E−02 | −3.1262E−02 | 3.4487E−01 | −1.1106E+00 | 1.9735E+00 |
| S7 | −9.7885E−02 | 3.6461E−02 | 3.2244E−02 | −8.3157E−02 | 6.4472E−02 |
| S8 | −5.9946E−02 | −1.0074E−02 | 5.6776E−02 | −6.2353E−02 | 3.7692E−02 |
| S9 | 1.4882E−02 | −5.5318E−02 | 1.5609E−01 | −3.1119E−01 | 4.0677E−01 |
| S10 | −2.1564E−01 | −3.8450E−02 | 2.6515E−01 | −4.6341E−01 | 5.1027E−01 |
| S11 | −1.3408E−01 | 7.8496E−02 | −4.0093E−02 | 1.6541E−02 | −5.6344E−03 |
| S12 | 2.0797E−01 | −1.1332E−01 | 5.5960E−02 | −2.0521E−02 | 5.1160E−03 |
| S13 | −4.1724E−03 | −1.0639E−01 | 6.2671E−02 | −1.7591E−02 | 2.7631E−03 |
| S14 | −2.0257E−01 | 6.9180E−02 | −2.0596E−02 | 5.2071E−03 | −1.0207E−03 |

| Surface number | A14 | A16 | A18 | A20 |
|---|---|---|---|---|
| S1 | 3.0147E−06 | −2.0430E−05 | 3.1818E−06 | −1.6617E−07 |
| S2 | −5.5352E−03 | 9.1270E−04 | −8.4580E−05 | 3.3917E−06 |
| S3 | −6.6301E−01 | 3.4981E−01 | −1.0351E−01 | 1.3130E−02 |
| S4 | 3.5644E+01 | −3.1463E+01 | 1.5223E+01 | −3.0491E+00 |
| S5 | 1.0308E+01 | −1.2502E+01 | 8.2147E+00 | −2.2137E+00 |
| S6 | −2.2051E+00 | 1.5332E+00 | −6.0692E−01 | 1.0408E−01 |
| S7 | −1.6650E−02 | −4.6791E−03 | 3.4677E−03 | −5.3148E−04 |
| S8 | −1.3645E−02 | 2.8889E−03 | −3.2160E−04 | 1.3690E−05 |
| S9 | −3.6213E−01 | 2.2537E−01 | −9.7595E−02 | 2.8606E−02 |
| S10 | −3.8695E−01 | 2.0629E−01 | −7.7070E−02 | 1.9747E−02 |
| S11 | 1.4804E−03 | −2.7914E−04 | 3.6141E−05 | −3.1050E−06 |
| S12 | −8.6364E−04 | 9.9137E−05 | −7.6728E−06 | 3.8849E−07 |
| S13 | −2.2741E−04 | 3.0708E−06 | 1.3379E−06 | −1.4736E−07 |
| S14 | 1.4558E−04 | −1.4693E−05 | 1.0313E−06 | −4.9079E−08 |

Figure 6A:
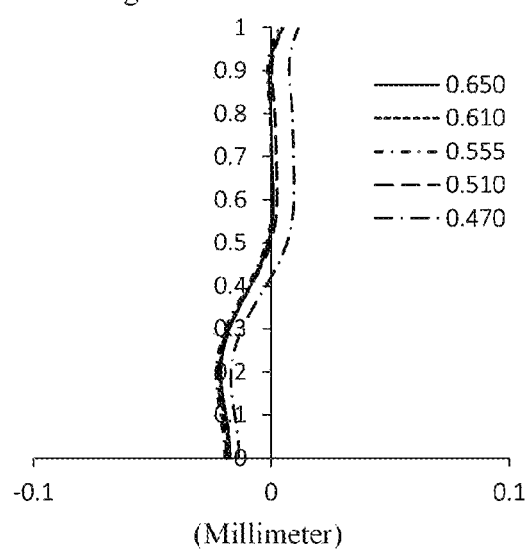
FIGS. 6A to 6C illustrate longitudinal aberration curves, astigmatic curves, and a lateral color curve of the optical imaging lens assembly of the example 3, respectively.
Figure 6B:
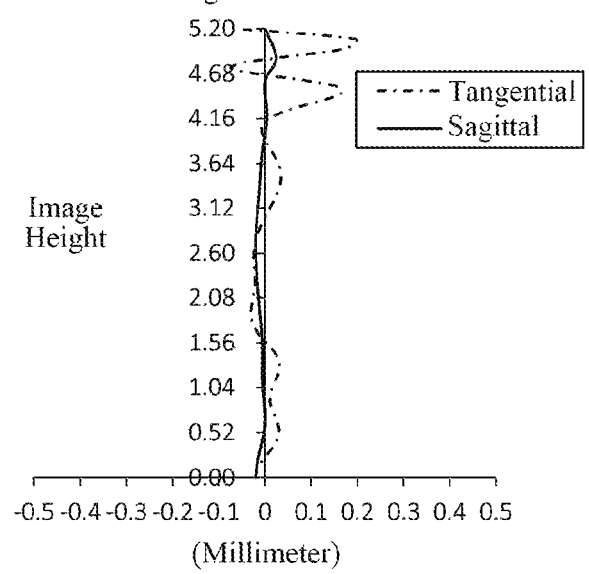
Figure 6C:
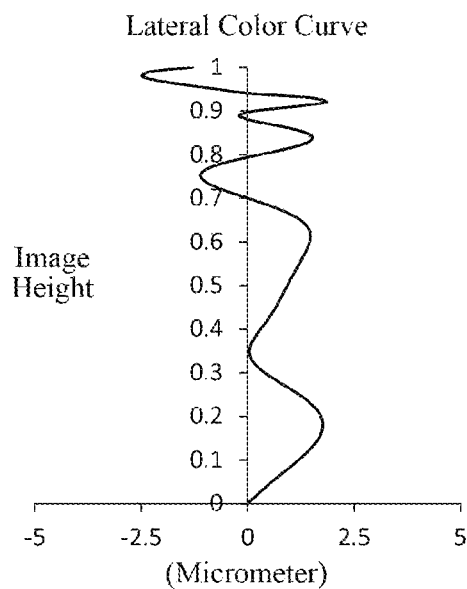

FIG. 6A illustrates longitudinal aberration curves of the optical imaging lens assembly according to example 3, representing the deviations of focal points converged by light of different wavelengths after passing through the lens assembly. FIG. 6B illustrates astigmatic curves of the optical imaging lens assembly according to example 3, representing the curvatures of a tangential plane and the curvatures of a sagittal plane. FIG. 6C illustrates a lateral color curve of the optical imaging lens assembly according to example 3, representing the deviations of different image heights on an imaging plane after light passes through the lens assembly. It can be seen from FIG. 6A to FIG. 6C that the optical imaging lens assembly provided in example 3 may achieve good image quality.

Example 4

Figure 7:
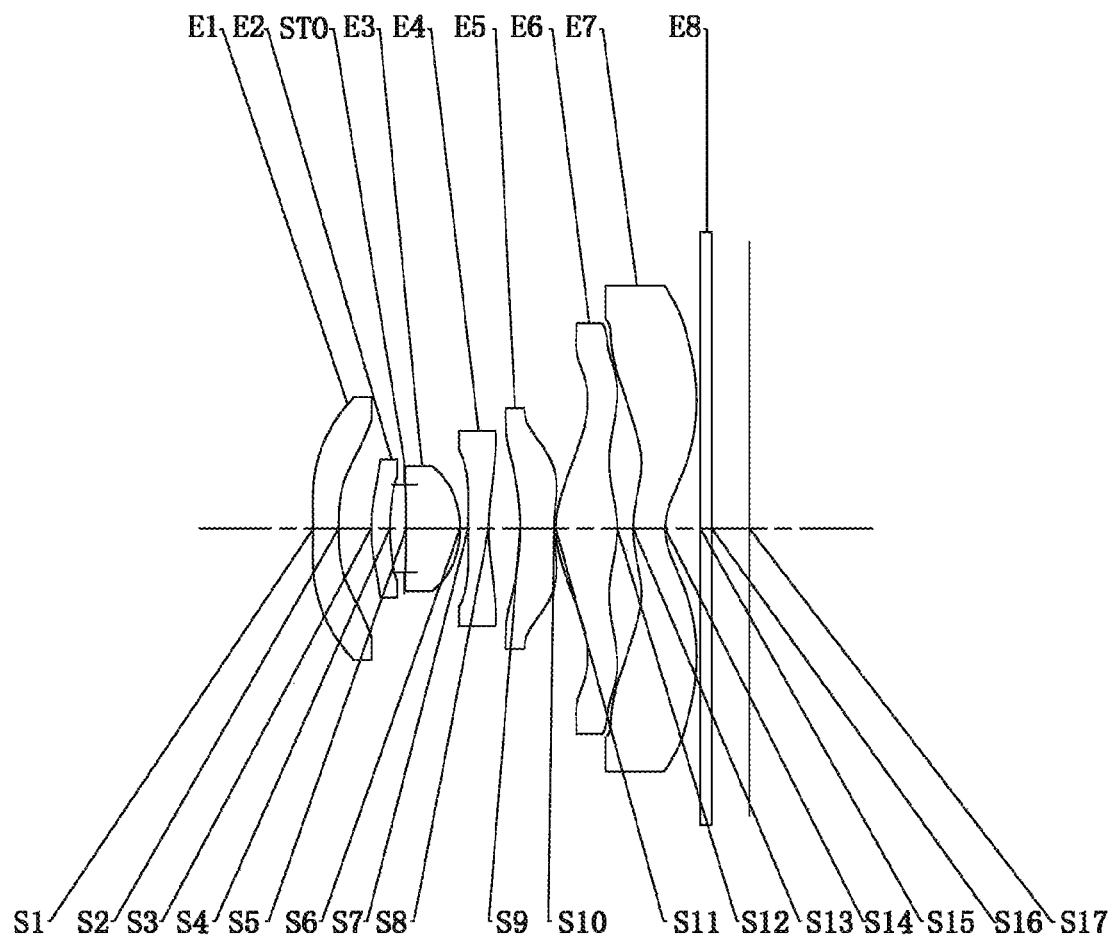
FIG. 7 illustrates a schematic structural view of an optical imaging lens assembly according to example 4 of the present disclosure.

An optical imaging lens assembly according to example 4 of the present disclosure is described below with reference to FIG. 7 to FIG. 8C. FIG. 7 shows a schematic structural view of the optical imaging lens assembly according to example 4 of the present disclosure.

As shown in FIG. 7, the optical imaging lens assembly includes a first lens E1, a second lens E2, a stop STO, a third lens E3, a fourth lens E4, a fifth lens E5, a sixth lens E6, a seventh lens E7 and an optical filter E8, which are sequentially arranged from an object side to an image side along an optical axis.

The first lens E1 has negative refractive power, an object-side surface S1 thereof is concave, and an image-side surface S2 thereof is concave. The second lens E2 has positive refractive power, an object-side surface S3 thereof is convex, and an image-side surface S4 thereof is concave. The third lens E3 has positive refractive power, an object-side surface S5 thereof is concave, and an image-side surface S6 thereof is convex. The fourth lens E4 has negative refractive power, an object-side surface S7 thereof is convex, and an image-side surface S8 thereof is concave. The fifth lens E5 has negative refractive power, an object-side surface S9 thereof is concave, and an image-side surface S10 thereof is concave. The sixth lens E6 has positive refractive power, an object-side surface S11 thereof is convex, and an image-side surface S12 thereof is convex. The seventh lens E7 has negative refractive power, an object-side surface S13 thereof is convex, and an image-side surface S14 thereof is concave. The optical filter E8 has an object-side surface S15 and an image-side surface S16. The optical imaging lens assembly has an imaging plane S17, and light from an object sequentially passes through the respective surfaces S1 to S16 and is finally imaged on the imaging plane S17.

In example 4, a total effective focal length f of the optical imaging lens assembly is 3.28 mm, an aperture number Fno of the optical imaging lens assembly is 2.27, a distance TTL along the optical axis from the object-side surface S1 of the first lens E1 to the imaging plane S17 is 7.92 mm, half of a diagonal length ImgH of an effective pixel area on the imaging plane S17 is 5.20 mm, and half of a maximum field-of-view Semi-FOV is 59.90°.

Table 7 is a table illustrating basic parameters of the optical imaging lens assembly of example 4, wherein the units for the radius of curvature, the thickness/distance and the focal length are millimeter (mm). Table 8 shows high-order coefficients applicable to each aspheric surface in example 4, wherein the surface shape of each aspheric surface may be defined by the formula (1) given in the above example 1.

TABLE 7

| Surface number | Surface type | Radius of curvature | Thickness/ Distance | Material Refractive index | Material Abbe number | Focal length | Conic coefficient |
|---|---|---|---|---|---|---|---|
| OBJ | Spherical | Infinite | Infinite | | | | |
| S1 | Aspheric | −12.8012 | 0.4595 | 1.54 | 55.8 | −8.84 | 0.7418 |
| S2 | Aspheric | 7.6367 | 0.5924 | | | | −4.1869 |

TABLE 7-continued

| Surface number | Surface type | Radius of curvature | Thickness/ Distance | Material Refractive index | Abbe number | Focal length | Conic coefficient |
|---|---|---|---|---|---|---|---|
| S3 | Aspheric | 2.9654 | 0.3407 | 1.57 | 37.3 | 17.89 | 0.4627 |
| S4 | Aspheric | 4.0061 | 0.2643 | | | | 2.3775 |
| STO | Spherical | Infinite | 0.0311 | | | | |
| S5 | Aspheric | −80.0000 | 0.9809 | 1.54 | 55.8 | 3.32 | 99.0000 |
| S6 | Aspheric | −1.7527 | 0.1453 | | | | 0.0629 |
| S7 | Aspheric | 11.4408 | 0.3730 | 1.67 | 20.4 | −8.63 | 9.5873 |
| S8 | Aspheric | 3.7789 | 0.5729 | | | | −0.0370 |
| S9 | Aspheric | −4.6241 | 0.6133 | 1.54 | 55.8 | −3.06 | −0.5173 |
| S10 | Aspheric | 2.6718 | 0.0350 | | | | 0.0110 |
| S11 | Aspheric | 1.6273 | 1.1150 | 1.55 | 56.1 | 1.81 | −1.0032 |
| S12 | Aspheric | −1.8980 | 0.2905 | | | | −1.0107 |
| S13 | Aspheric | 2.3573 | 0.5791 | 1.65 | 23.5 | −3.61 | −1.0195 |
| S14 | Aspheric | 1.0576 | 0.6397 | | | | −0.9972 |
| S15 | Spherical | Infinite | 0.2100 | 1.51 | 64.2 | | |
| S16 | Spherical | Infinite | 0.6814 | | | | |
| S17 | Spherical | Infinite | | | | | |

TABLE 8

| Surface number | A4 | A6 | A8 | A10 | A12 |
|---|---|---|---|---|---|
| S1 | 1.0521E−01 | −5.6632E−02 | 2.9023E−02 | −1.1450E−02 | 3.1589E−03 |
| S2 | 1.4383E−01 | −8.9592E−02 | 5.8359E−02 | −3.1269E−02 | 7.8940E−03 |
| S3 | 3.5226E−03 | −9.5720E−02 | 1.6281E−01 | −3.5546E−01 | 4.7354E−01 |
| S4 | 2.4223E−02 | −2.0544E−01 | 1.4971E+00 | −7.4736E+00 | 2.2722E+01 |
| S5 | −9.3230E−03 | −7.8966E−02 | 2.8332E−01 | −4.8775E−01 | −8.4198E−01 |
| S6 | −4.5082E−02 | −1.2113E−02 | 2.9790E−01 | −1.1383E+00 | 2.3325E+00 |
| S7 | −1.0472E−01 | 4.9898E−02 | 3.6349E−03 | −6.4775E−02 | 8.9566E−02 |
| S8 | −6.0125E−02 | −1.8639E−04 | 4.0688E−02 | −5.2734E−02 | 3.8088E−02 |
| S9 | 1.7611E−02 | −4.3735E−02 | 1.0037E−01 | −1.5501E−01 | 1.5774E−01 |
| S10 | −2.0543E−01 | −8.2628E−03 | 1.3305E−01 | −1.8890E−01 | 1.6598E−01 |
| S11 | −1.2543E−01 | 7.1535E−02 | −3.5472E−02 | 1.3327E−02 | −3.7824E−03 |
| S12 | 1.8215E−01 | −6.4644E−02 | 1.2716E−02 | 6.0578E−04 | −1.2392E−03 |
| S13 | −3.2450E−02 | −7.2866E−02 | 4.5996E−02 | −1.3852E−02 | 2.5343E−03 |
| S14 | −2.2280E−01 | 8.6236E−02 | −2.9353E−02 | 8.1264E−03 | −1.6859E−03 |

| Surface number | A14 | A16 | A18 | A20 |
|---|---|---|---|---|
| S1 | −5.7535E−04 | 6.4768E−05 | −3.9627E−06 | 9.4255E−08 |
| S2 | 9.6932E−05 | −4.8617E−04 | 9.6438E−05 | −6.1767E−06 |
| S3 | −3.7592E−01 | 1.8948E−01 | −5.7029E−02 | 7.7138E−03 |
| S4 | −4.2254E+01 | 4.7332E+01 | −2.9322E+01 | 7.7502E+00 |
| S5 | 5.1283E+00 | −9.0389E+00 | 7.2290E+00 | −2.2137E+00 |
| S6 | −2.9412E+00 | 2.2475E+00 | −9.5383E−01 | 1.7215E−01 |
| S7 | −7.0338E−02 | 3.4332E−02 | −9.7520E−03 | 1.2307E−03 |
| S8 | −1.7180E−02 | 4.7798E−03 | −7.5178E−04 | 5.1121E−05 |
| S9 | −1.1101E−01 | 5.6207E−02 | −2.0550E−02 | 5.2778E−03 |
| S10 | −9.9652E−02 | 4.1552E−02 | −1.1942E−02 | 2.3127E−03 |
| S11 | 7.9215E−04 | −1.1903E−04 | 1.2497E−05 | −8.8793E−07 |
| S12 | 3.8892E−04 | −6.7433E−05 | 7.3634E−06 | −5.1822E−07 |
| S13 | −2.9445E−04 | 2.0324E−05 | −5.2354E−07 | −3.7214E−08 |
| S14 | 2.5087E−04 | −2.6276E−05 | 1.9089E−06 | −9.3837E−08 |

FIG. 8A illustrates longitudinal aberration curves of the optical imaging lens assembly according to example 4, representing the deviations of focal points converged by light of different wavelengths after passing through the lens assembly. FIG. 8B illustrates astigmatic curves of the optical imaging lens assembly according to example 4, representing the curvatures of a tangential plane and the curvatures of a sagittal plane. FIG. 8C illustrates a lateral color curve of the optical imaging lens assembly according to example 4, representing the deviations of different image heights on an imaging plane after light passes through the lens assembly. It can be seen from FIG. 8A to FIG. 8C that the optical imaging lens assembly provided in example 4 may achieve good image quality.

Example 5

Figure 9:
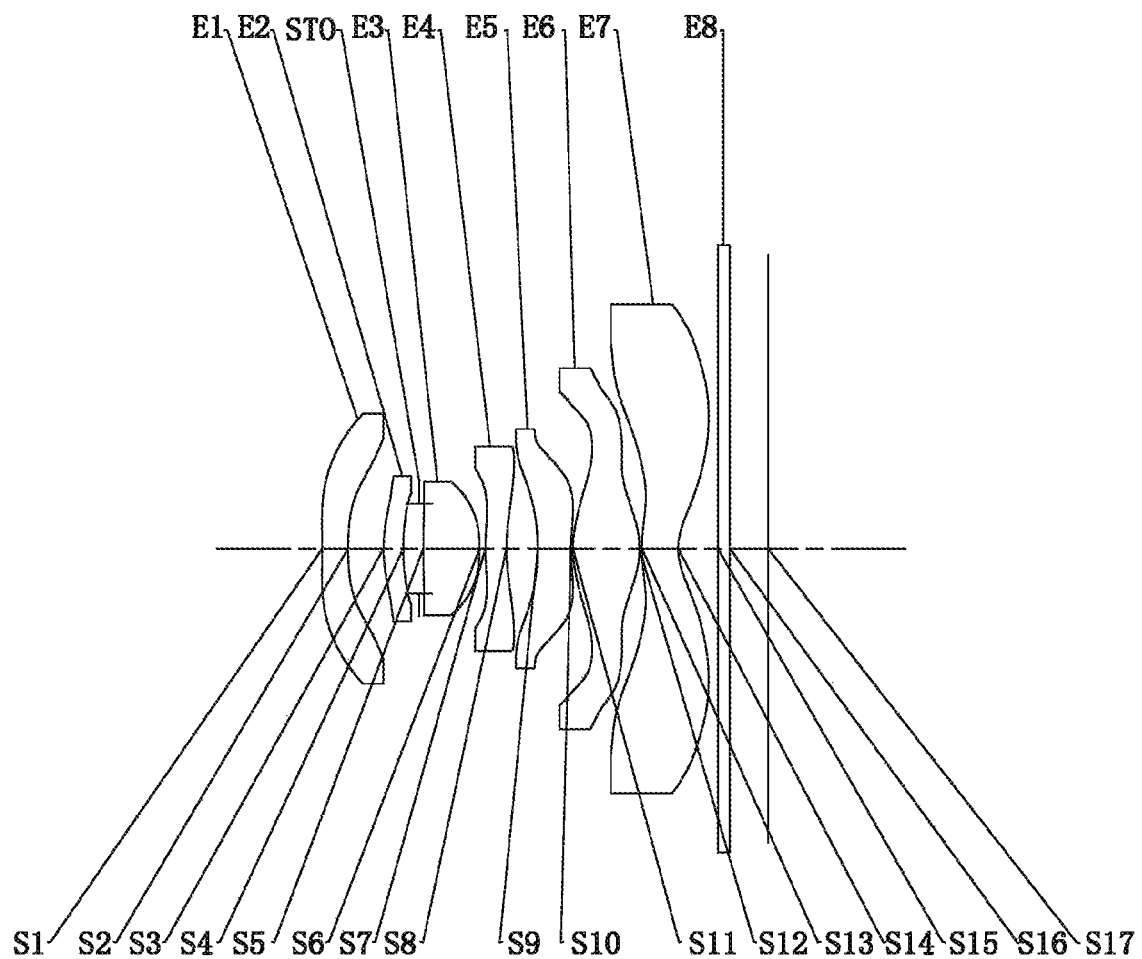
FIG. 9 illustrates a schematic structural view of an optical imaging lens assembly according to example 5 of the present disclosure.

An optical imaging lens assembly according to example 5 of the present disclosure is described below with reference to FIG. 9 to FIG. 10C. FIG. 9 shows a schematic structural view of the optical imaging lens assembly according to example 5 of the present disclosure.

As shown in FIG. 9, the optical imaging lens assembly includes a first lens E1, a second lens E2, a stop STO, a third lens E3, a fourth lens E4, a fifth lens E5, a sixth lens E6, a seventh lens E7 and an optical filter E8, which are sequentially arranged from an object side to an image side along an optical axis.

The first lens E1 has negative refractive power, an object-side surface S1 thereof is concave, and an image-side surface S2 thereof is concave. The second lens E2 has positive refractive power, an object-side surface S3 thereof is convex, and an image-side surface S4 thereof is concave. The third lens E3 has positive refractive power, an object-side surface S5 thereof is convex, and an image-side surface S6 thereof is convex. The fourth lens E4 has positive refractive power, an object-side surface S7 thereof is convex, and an image-side surface S8 thereof is concave. The fifth lens E5 has negative refractive power, an object-side surface S9 thereof is concave, and an image-side surface S10 thereof is concave. The sixth lens E6 has positive refractive power, an object-side surface S11 thereof is convex, and an image-side surface S12 thereof is convex. The seventh lens E7 has negative refractive power, an object-side surface S13 thereof is convex, and an image-side surface S14 thereof is concave. The optical filter E8 has an object-side surface S15 and an image-side surface S16. The optical imaging lens assembly has an imaging plane S17, and light from an object sequentially passes through the respective surfaces S1 to S16 and is finally imaged on the imaging plane S17.

In example 5, a total effective focal length f of the optical imaging lens assembly is 3.28 mm, an aperture number Fno of the optical imaging lens assembly is 2.27, a distance TTL along the optical axis from the object-side surface S1 of the first lens E1 to the imaging plane S17 is 7.91 mm, half of a diagonal length ImgH of an effective pixel area on the imaging plane S17 is 5.20 mm, and half of a maximum field-of-view Semi-FOV is 59.90°.

Table 9 is a table illustrating basic parameters of the optical imaging lens assembly of example 5, wherein the units for the radius of curvature, the thickness/distance and the focal length are millimeter (mm). Table 10 shows high-order coefficients applicable to each aspheric surface in example 5, wherein the surface shape of each aspheric surface may be defined by the formula (1) given in the above example 1.

TABLE 9

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Aspheric | −12.8012 | 0.4595 | 1.54 | 55.8 | −8.16 | −1.1597 |
| S2 | Aspheric | 6.7390 | 0.6295 | | | | −3.0328 |
| S3 | Aspheric | 2.7698 | 0.3476 | 1.57 | 37.3 | 15.02 | 0.0854 |
| S4 | Aspheric | 3.9062 | 0.2815 | | | | 0.2564 |
| STO | Spherical | Infinite | 0.0751 | | | | |
| S5 | Aspheric | 16.7996 | 0.9982 | 1.54 | 55.8 | 4.69 | 75.2240 |
| S6 | Aspheric | −2.9000 | 0.1021 | | | | 1.5557 |
| S7 | Aspheric | 3.1937 | 0.3730 | 1.67 | 20.4 | 80.00 | −35.0112 |
| S8 | Aspheric | 3.2382 | 0.5560 | | | | −0.3781 |
| S9 | Aspheric | −3.4573 | 0.5880 | 1.54 | 55.8 | −2.81 | −0.2056 |
| S10 | Aspheric | 2.8288 | 0.0350 | | | | 0.0376 |
| S11 | Aspheric | 1.6822 | 1.1827 | 1.55 | 56.1 | 1.66 | −0.9732 |
| S12 | Aspheric | −1.4863 | 0.0424 | | | | −0.9763 |
| S13 | Aspheric | 3.0989 | 0.6431 | 1.65 | 23.5 | −2.77 | −0.7800 |
| S14 | Aspheric | 1.0408 | 0.7051 | | | | −0.9965 |
| S15 | Spherical | Infinite | 0.2100 | 1.51 | 64.2 | | |
| S16 | Spherical | Infinite | 0.6814 | | | | |
| S17 | Spherical | Infinite | | | | | |

TABLE 10

| Surface number | A4 | A6 | A8 | A10 | A12 |
|---|---|---|---|---|---|
| S1 | 9.8098E−02 | −4.8821E−02 | 2.2141E−02 | −7.2268E−03 | 1.4997E−03 |
| S2 | 1.2524E−01 | −4.7381E−02 | −1.1844E−02 | 4.5367E−02 | −4.1520E−02 |
| S3 | −1.6254E−02 | −7.7185E−04 | −2.2692E−01 | 6.4946E−01 | −1.1170E+00 |
| S4 | 2.6231E−02 | −2.7033E−01 | 1.6257E+00 | −6.4316E+00 | 1.5890E+01 |
| S5 | −8.8248E−03 | 2.5829E−02 | −4.1084E−01 | 2.0583E+00 | −6.1208E+00 |
| S6 | −3.6824E−01 | 8.3609E−01 | −1.7574E+00 | 2.9038E+00 | −3.5847E+00 |
| S7 | −2.3068E−01 | 4.1141E−01 | −7.4795E−01 | 1.0296E+00 | −1.0150E+00 |
| S8 | −7.5139E−02 | −3.6691E−03 | 6.7055E−02 | −8.6998E−02 | 6.0094E−02 |
| S9 | 5.8644E−02 | −2.1696E−01 | 5.0783E−01 | −8.5685E−01 | 1.0138E+00 |
| S10 | −2.8108E−01 | 1.5542E−01 | 9.9457E−02 | −4.1494E−01 | 4.8512E−01 |
| S11 | −2.8023E−01 | 3.5674E−01 | −3.1695E−01 | 1.8595E−01 | −7.3593E−02 |
| S12 | 1.6673E−01 | −1.6479E−01 | 1.7740E−01 | −1.1054E−01 | 4.2647E−02 |
| S13 | −5.6204E−02 | −1.1413E−01 | 1.1981E−01 | −5.8096E−02 | 1.7240E−02 |
| S14 | −2.7043E−01 | 1.1544E−01 | −3.5368E−02 | 7.6528E−03 | −1.1916E−03 |

| Surface number | A14 | A16 | A18 | A20 |
|---|---|---|---|---|
| S1 | −1.5882E−04 | −1.1153E−06 | 2.0529E−06 | −1.4603E−07 |
| S2 | 1.8843E−02 | −4.6145E−03 | 5.8577E−04 | −3.0363E−05 |
| S3 | 1.1610E+00 | −6.9258E−01 | 2.1892E−01 | −2.8527E−02 |

TABLE 10-continued

| | | | | |
|---|---|---|---|---|
| S4 | −2.4572E+01 | 2.3318E+01 | −1.2392E+01 | 2.8306E+00 |
| S5 | 1.1282E+01 | −1.2724E+01 | 8.0790E+00 | −2.2137E+00 |
| S6 | 3.0766E+00 | −1.7028E+00 | 5.4006E−01 | −7.4036E−02 |
| S7 | 6.6942E−01 | −2.7571E−01 | 6.3483E−02 | −6.1996E−03 |
| S8 | −2.5183E−02 | 6.4698E−03 | −9.4808E−04 | 6.0996E−05 |
| S9 | −8.3644E−01 | 4.8418E−01 | −1.9612E−01 | 5.4488E−02 |
| S10 | −3.2051E−01 | 1.3524E−01 | −3.7576E−02 | 6.7960E−03 |
| S11 | 1.9576E−02 | −3.4194E−03 | 3.7077E−04 | −2.1355E−05 |
| S12 | −1.1071E−02 | 2.0195E−03 | −2.6157E−04 | 2.3608E−05 |
| S13 | −3.4055E−03 | 4.6269E−04 | −4.3497E−05 | 2.7825E−06 |
| S14 | 1.3631E−04 | −1.1599E−05 | 7.3167E−07 | −3.3288E−08 |

Figure 10A:
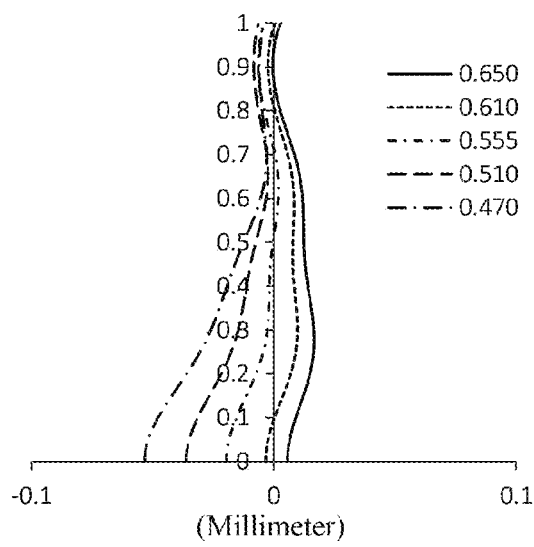
FIGS. 10A to 10C illustrate longitudinal aberration curves, astigmatic curves, and a lateral color curve of the optical imaging lens assembly of the example 5, respectively.
Figure 10B:
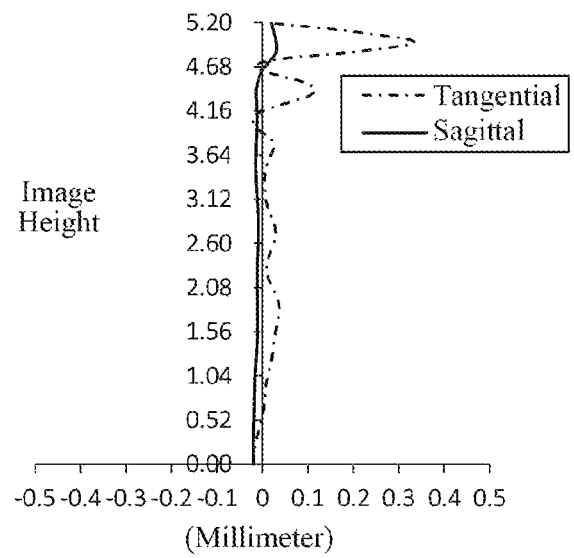
Figure 10C:
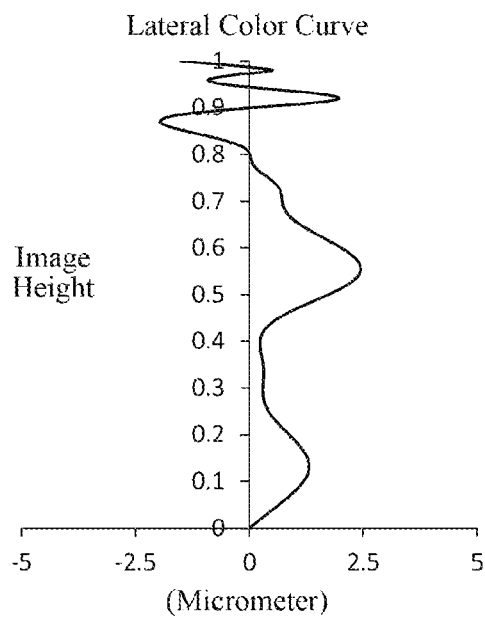

FIG. 10A illustrates longitudinal aberration curves of the optical imaging lens assembly according to example 5, representing the deviations of focal points converged by light of different wavelengths after passing through the lens assembly. FIG. 10B illustrates astigmatic curves of the optical imaging lens assembly according to example 5, representing the curvatures of a tangential plane and the curvatures of a sagittal plane. FIG. 10C illustrates a lateral color curve of the optical imaging lens assembly according to example 5, representing the deviations of different image heights on an imaging plane after light passes through the lens assembly. It can be seen from FIG. 10A to FIG. 10C that the optical imaging lens assembly provided in example 5 may achieve good image quality.

Example 6

Figure 11:
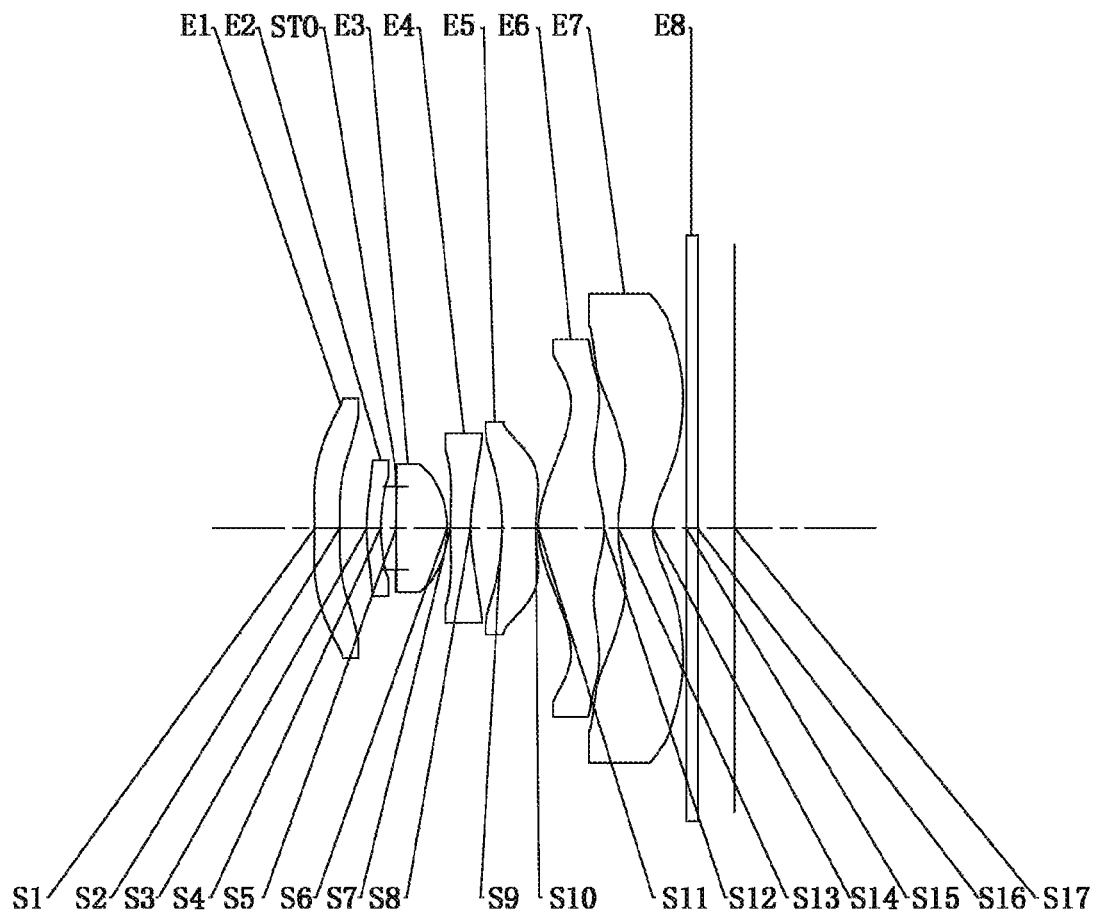
FIG. 11 illustrates a schematic structural view of an optical imaging lens assembly according to example 6 of the present disclosure.

An optical imaging lens assembly according to example 6 of the present disclosure is described below with reference to FIG. 11 to FIG. 12C. FIG. 11 shows a schematic structural view of the optical imaging lens assembly according to example 6 of the present disclosure.

As shown in FIG. 11, the optical imaging lens assembly includes a first lens E1, a second lens E2, a stop STO, a third lens E3, a fourth lens E4, a fifth lens E5, a sixth lens E6, a seventh lens E7 and an optical filter E8, which are sequentially arranged from an object side to an image side along an optical axis.

The first lens E1 has negative refractive power, an object-side surface S1 thereof is concave, and an image-side surface S2 thereof is convex. The second lens E2 has negative refractive power, an object-side surface S3 thereof is convex, and an image-side surface S4 thereof is concave. The third lens E3 has positive refractive power, an object-side surface S5 thereof is convex, and an image-side surface S6 thereof is convex. The fourth lens E4 has negative refractive power, an object-side surface S7 thereof is convex, and an image-side surface S8 thereof is concave. The fifth lens E5 has negative refractive power, an object-side surface S9 thereof is concave, and an image-side surface S10 thereof is concave. The sixth lens E6 has positive refractive power, an object-side surface S11 thereof is convex, and an image-side surface S12 thereof is convex. The seventh lens E7 has negative refractive power, an object-side surface S13 thereof is convex, and an image-side surface S14 thereof is concave. The optical filter E8 has an object-side surface S15 and an image-side surface S16. The optical imaging lens assembly has an imaging plane S17, and light from an object sequentially passes through the respective surfaces S1 to S16 and is finally imaged on the imaging plane S17.

In example 6, a total effective focal length f of the optical imaging lens assembly is 3.36 mm, an aperture number Fno of the optical imaging lens assembly is 2.27, a distance TTL along the optical axis from the object-side surface S1 of the first lens E1 to the imaging plane S17 is 7.75 mm, half of a diagonal length ImgH of an effective pixel area on the imaging plane S17 is 5.35 mm, and half of a maximum field-of-view Semi-FOV is 61.22°.

Table 11 is a table illustrating basic parameters of the optical imaging lens assembly of example 6, wherein the units for the radius of curvature, the thickness/distance and the focal length are millimeter (mm). Table 12 shows high-order coefficients applicable to each aspheric surface in example 6, wherein the surface shape of each aspheric surface may be defined by the formula (1) given in the above example 1.

TABLE 11

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Aspheric | −12.8012 | 0.4595 | 1.54 | 55.8 | −38.00 | 19.9131 |
| S2 | Aspheric | −34.8042 | 0.5009 | | | | −3.6066 |
| S3 | Aspheric | 4.7163 | 0.2580 | 1.57 | 37.3 | −26.39 | 3.5642 |
| S4 | Aspheric | 3.5197 | 0.2757 | | | | 1.6154 |
| STO | Spherical | Infinite | 0.0079 | | | | |
| S5 | Aspheric | 18.1723 | 0.9437 | 1.54 | 55.8 | 3.21 | −92.6377 |
| S6 | Aspheric | −1.8714 | 0.0567 | | | | −0.0047 |
| S7 | Aspheric | 8.0916 | 0.3730 | 1.67 | 20.4 | −7.89 | 14.2243 |
| S8 | Aspheric | 3.1304 | 0.5814 | | | | −0.0917 |
| S9 | Aspheric | −4.3112 | 0.6202 | 1.54 | 55.8 | −2.95 | 0.0393 |
| S10 | Aspheric | 2.6333 | 0.0462 | | | | −0.0545 |
| S11 | Aspheric | 1.5818 | 1.2124 | 1.55 | 56.1 | 1.75 | −1.0126 |
| S12 | Aspheric | −1.7688 | 0.2631 | | | | −1.0279 |
| S13 | Aspheric | 2.6560 | 0.6393 | 1.65 | 23.5 | −3.55 | −0.9228 |
| S14 | Aspheric | 1.1127 | 0.6168 | | | | −0.9972 |

TABLE 11-continued

| Surface number | Surface type | Radius of curvature | Thickness/ Distance | Material Refractive index | Material Abbe number | Focal length | Conic coefficient |
|---|---|---|---|---|---|---|---|
| S15 | Spherical | Infinite | 0.2100 | 1.51 | 64.2 | | |
| S16 | Spherical | Infinite | 0.6814 | | | | |
| S17 | Spherical | Infinite | | | | | |

TABLE 12

| Surface number | A4 | A6 | A8 | A10 | A12 |
|---|---|---|---|---|---|
| S1 | 8.4580E−02 | −3.5316E−02 | 1.4493E−02 | −4.2956E−03 | 6.2022E−04 |
| S2 | 1.2460E−01 | −8.1425E−02 | 5.8396E−02 | −3.9494E−02 | 1.8206E−02 |
| S3 | 2.9491E−02 | −1.2544E−01 | 1.2104E−01 | −9.5245E−02 | 2.3247E−02 |
| S4 | 2.5953E−02 | 4.1325E−02 | −1.0293E+00 | 5.1755E+00 | −1.4510E+01 |
| S5 | 4.8946E−03 | −1.3786E−01 | 7.1231E−01 | −2.5550E+00 | 5.2387E+00 |
| S6 | −5.4789E−02 | 1.3926E−01 | −4.6914E−01 | 1.1819E+00 | −2.0408E+00 |
| S7 | −1.0731E−01 | 7.2026E−02 | −5.9691E−02 | 7.1730E−02 | −1.0891E−01 |
| SS | −6.6617E−02 | −4.5573E−03 | 5.9328E−02 | −7.3179E−02 | 4.8701E−02 |
| S9 | 1.0723E−03 | 4.6174E−02 | −2.4273E−01 | 5.7437E−01 | −8.2308E−01 |
| S10 | −2.0623E−01 | −2.2291E−02 | 2.3841E−01 | −4.6680E−01 | 5.4237E−01 |
| S11 | −1.3527E−01 | 9.5977E−02 | −6.5203E−02 | 3.5965E−02 | −1.4926E−02 |
| S12 | 1.6309E−01 | −6.8073E−02 | 3.3699E−02 | −1.3702E−02 | 3.6341E−03 |
| S13 | −3.4281E−02 | −6.5720E−02 | 4.1313E−02 | −1.2169E−02 | 2.2504E−03 |
| S14 | −2.1212E−01 | 8.6806E−02 | −3.1920E−02 | 9.3373E−03 | −1.9927E−03 |

| Surface number | A14 | A16 | A18 | A20 |
|---|---|---|---|---|
| S1 | 3.5751E−05 | −2.8690E−05 | 4.1895E−06 | −2.1404E−07 |
| S2 | −5.3021E−03 | 9.4402E−04 | −9.4296E−05 | 4.0526E−06 |
| S3 | 7.3294E−02 | −9.3571E−02 | 4.5597E−02 | −8.2642E−03 |
| S4 | 2.4854E+01 | −2.5517E+01 | 1.4367E+01 | −3.3768E+00 |
| S5 | −5.5518E+00 | 1.1360E+00 | 3.2034E+00 | −2.2137E+00 |
| S6 | 2.1843E+00 | −1.3738E+00 | 4.5605E−01 | −6.0095E−02 |
| S7 | 1.0937E−01 | −6.1360E−02 | 1.7739E−02 | −2.0623E−03 |
| SS | −1.9498E−02 | 4.6427E−03 | −5.9793E−04 | 3.1121E−05 |
| S9 | 7.7186E−01 | −4.8750E−01 | 2.0936E−01 | −6.0468E−02 |
| S10 | −4.1455E−01 | 2.1583E−01 | −7.7198E−02 | 1.8736E−02 |
| S11 | 4.3746E−03 | −8.8019E−04 | 1.1983E−04 | −1.0810E−05 |
| S12 | −6.1487E−04 | 6.6335E−05 | −4.4397E−06 | 1.6780E−07 |
| S13 | −3.0717E−04 | 3.5381E−05 | −3.5033E−06 | 2.6714E−07 |
| S14 | 3.0053E−04 | −3.1726E−05 | 2.3204E−06 | −1.1491E−07 |

FIG. 12A illustrates longitudinal aberration curves of the optical imaging lens assembly according to example 6, representing the deviations of focal points converged by light of different wavelengths after passing through the lens assembly. FIG. 12B illustrates astigmatic curves of the optical imaging lens assembly according to example 6, representing the curvatures of a tangential plane and the curvatures of a sagittal plane. FIG. 12C illustrates a lateral color curve of the optical imaging lens assembly according to example 6, representing the deviations of different image heights on an imaging plane after light passes through the lens assembly. It can be seen from FIG. 12A to FIG. 12C that the optical imaging lens assembly provided in example 6 may achieve good image quality.

Example 7

Figure 13:
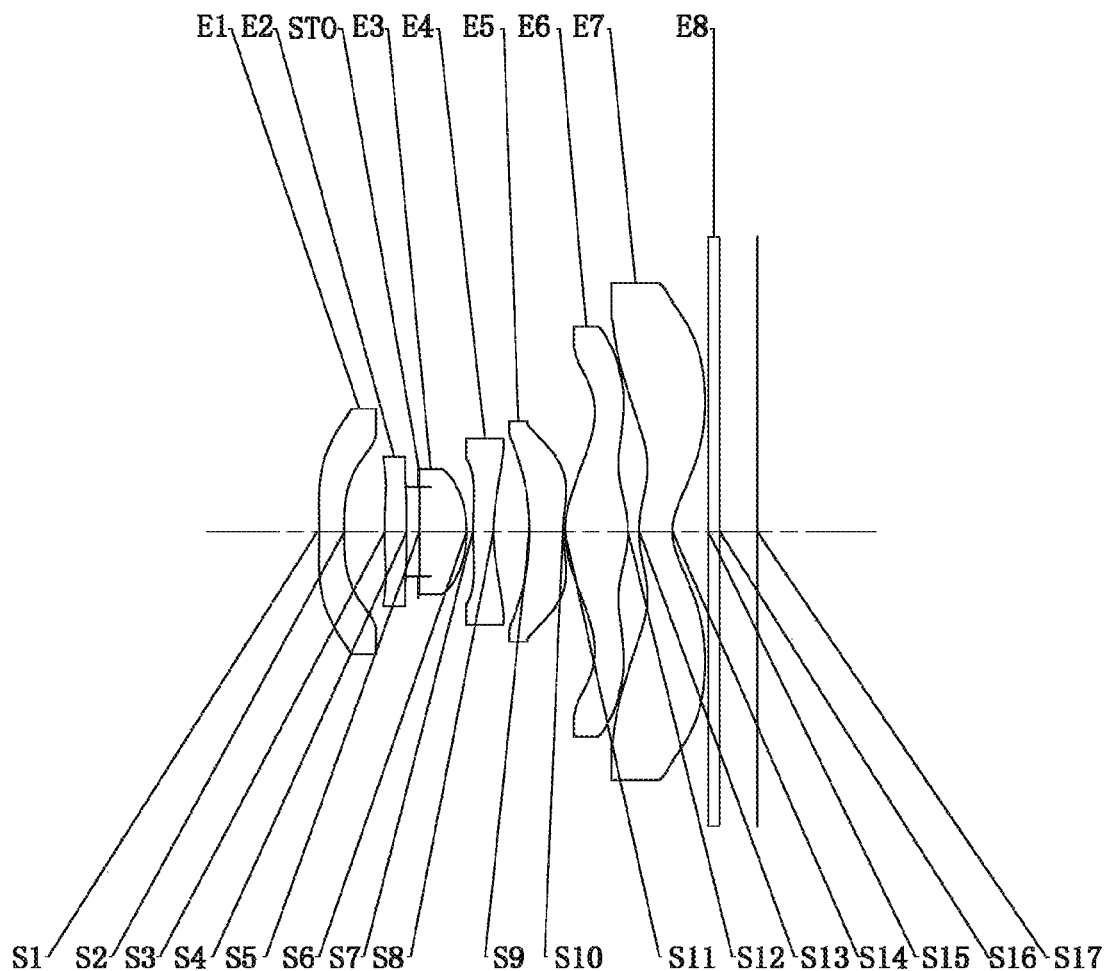
FIG. 13 illustrates a schematic structural view of an optical imaging lens assembly according to example 7 of the present disclosure.

An optical imaging lens assembly according to example 7 of the present disclosure is described below with reference to FIG. 13 to FIG. 14C. FIG. 13 shows a schematic structural view of the optical imaging lens assembly according to example 7 of the present disclosure.

As shown in FIG. 13, the optical imaging lens assembly includes a first lens E1, a second lens E2, a stop STO, a third lens E3, a fourth lens E4, a fifth lens E5, a sixth lens E6, a seventh lens E7 and an optical filter E8, which are sequentially arranged from an object side to an image side along an optical axis.

The first lens E1 has negative refractive power, an object-side surface S1 thereof is concave, and an image-side surface S2 thereof is concave. The second lens E2 has positive refractive power, an object-side surface S3 thereof is convex, and an image-side surface S4 thereof is convex. The third lens E3 has positive refractive power, an object-side surface S5 thereof is convex, and an image-side surface S6 thereof is convex. The fourth lens E4 has negative refractive power, an object-side surface S7 thereof is convex, and an image-side surface S8 thereof is concave. The fifth lens E5 has negative refractive power, an object-side surface S9 thereof is concave, and an image-side surface S10 thereof is concave. The sixth lens E6 has positive refractive power, an object-side surface S11 thereof is convex, and an image-side surface S12 thereof is convex. The seventh lens E7 has negative refractive power, an object-side surface S13 thereof is convex, and an image-side surface S14 thereof is concave. The optical filter E8 has an object-side surface S15 and an image-side surface S16. The optical imaging lens assembly has an imaging plane S17, and light from an object sequentially passes through the respective surfaces S1 to S16 and is finally imaged on the imaging plane S17.

In example 7, a total effective focal length f of the optical imaging lens assembly is 3.36 mm, an aperture number Fno of the optical imaging lens assembly is 2.28, a distance TTL along the optical axis from the object-side surface S1 of the first lens E1 to the imaging plane S17 is 7.99 mm, half of a diagonal length ImgH of an effective pixel area on the imaging plane S17 is 5.33 mm, and half of a maximum field-of-view Semi-FOV is 60.78°.

Table 13 is a table illustrating basic parameters of the optical imaging lens assembly of example 7, wherein the units for the radius of curvature, the thickness/distance and the focal length are millimeter (mm). Table 14 shows high-order coefficients applicable to each aspheric surface in example 7, wherein the surface shape of each aspheric surface may be defined by the formula (1) given in the above example 1.

TABLE 13

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Aspheric | −12.7538 | 0.4595 | 1.54 | 55.8 | −11.13 | 0.0000 |
| S2 | Aspheric | 11.3722 | 0.7382 | | | | 0.0000 |
| S3 | Aspheric | 9.4264 | 0.4005 | 1.57 | 37.3 | 14.44 | −9.9611 |
| S4 | Aspheric | −64.2657 | 0.2113 | | | | −85.3106 |
| STO | Spherical | Infinite | 0.0217 | | | | |
| S5 | Aspheric | 48.5880 | 0.8611 | 1.54 | 55.8 | 3.93 | 72.1556 |
| S6 | Aspheric | −2.1906 | 0.1143 | | | | 0.0000 |
| S7 | Aspheric | 6.7855 | 0.3730 | 1.67 | 20.4 | −8.90 | −17.1797 |
| S8 | Aspheric | 3.0961 | 0.6570 | | | | −0.4258 |
| S9 | Aspheric | −5.4085 | 0.6108 | 1.54 | 55.8 | −2.80 | 3.4528 |
| S10 | Aspheric | 2.1680 | 0.0350 | | | | 0.0000 |
| S11 | Aspheric | 1.5155 | 1.1532 | 1.55 | 56.1 | 1.68 | −1.0078 |
| S12 | Aspheric | −1.6971 | 0.2048 | | | | −1.0100 |
| S13 | Aspheric | 2.4247 | 0.6044 | 1.65 | 23.5 | −3.25 | −1.0019 |
| S14 | Aspheric | 1.0143 | 0.6541 | | | | −0.9999 |
| S15 | Spherical | Infinite | 0.2100 | 1.51 | 64.2 | | |
| S16 | Spherical | Infinite | 0.6814 | | | | |
| S17 | Spherical | Infinite | | | | | |

TABLE 14

| Surface number | A4 | A6 | A8 | A10 | A12 |
|---|---|---|---|---|---|
| S1 | 9.1541E−02 | −5.3271E−02 | 6.2581E−02 | −8.7112E−02 | 9.6013E−02 |
| S2 | 1.1866E−01 | −4.1071E−02 | 6.2036E−01 | −2.4871E−01 | 6.6419E−01 |
| S3 | −1.1291E−02 | −2.6930E−02 | −7.4730E−02 | 4.6299E−01 | −1.3264E+00 |
| S4 | 6.6787E−03 | −3.3519E−01 | 3.5161E+00 | −2.6326E+01 | 1.3604E+02 |
| S5 | −1.1947E−02 | 9.0338E−02 | −8.9849E−01 | 4.0258E+00 | −1.0987E+01 |
| S6 | −4.8200E−02 | −1.4304E−01 | 1.5845E+00 | −7.8756E+00 | 2.3406E+01 |
| S7 | −1.0300E−01 | 6.0457E−02 | 3.0598E−02 | −4.0064E−01 | 1.0637E+00 |
| S8 | −6.9423E−02 | 3.2092E−02 | −2.2833E−02 | 2.0983E−02 | −2.0219E−02 |
| S9 | −3.1853E−02 | 6.9380E−02 | −1.7255E−01 | 3.2473E−01 | −4.2595E−01 |
| S10 | −3.0497E−01 | 1.0134E−01 | 1.3374E−01 | −4.5917E−01 | 6.9999E−01 |
| S11 | −1.8705E−01 | 1.5351E−01 | −1.0709E−01 | 6.0398E−02 | −2.6964E−02 |
| S12 | 2.3310E−01 | −1.8688E−01 | 1.5489E−01 | −8.9466E−02 | 3.4196E−02 |
| S13 | 8.8362E−03 | −1.7164E−01 | 1.4727E−01 | −7.0287E−02 | 2.2009E−02 |
| S14 | −2.4042E−01 | 8.9606E−02 | −2.4406E−02 | 4.5931E−03 | −5.7705E−04 |

| Surface number | A14 | A16 | A18 | A20 |
|---|---|---|---|---|
| S1 | −7.6052E−02 | 4.3113E−02 | −1.7618E−02 | 5.1934E−03 |
| S2 | −1.1167E+00 | 1.2680E+00 | −1.0110E+00 | 5.7411E−01 |
| S3 | 2.0836E+00 | −1.4995E+00 | −5.3722E−01 | 2.3144E+00 |
| S4 | −4.9523E+02 | 1.2901E+03 | −2.4235E+03 | 3.2804E+03 |
| S5 | 1.8357E+01 | −1.8202E+01 | 9.6980E+00 | −2.1011E+00 |
| S6 | 4.5075E+01 | 5.7394E+01 | −4.7835E+01 | 2.4918E+01 |
| S7 | −1.6279E+00 | 1.6040E+00 | −1.0328E+00 | 4.2095E−01 |
| S8 | 1.6531E−02 | −1.0145E−02 | 4.3571E−03 | −1.2198E−03 |
| S9 | 3.8723E−01 | −2.4432E−01 | 1.0659E−01 | −3.1533E−02 |
| S10 | −6.9723E−01 | 4.9026E−01 | −2.4942E−01 | 9.2264E−02 |
| S11 | 9.0594E−03 | −2.2279E−03 | 3.9741E−04 | −5.1136E−05 |
| S12 | −8.9944E−03 | 1.6853E−03 | −2.2940E−04 | 2.2802E−05 |
| S13 | −4.7801E−03 | 7.4100E−04 | −8.3263E−05 | 6.8141E−06 |
| S14 | 4.4428E−05 | −1.2222E−06 | −1.5733E−07 | 2.4182E−08 |

Figure 14A:
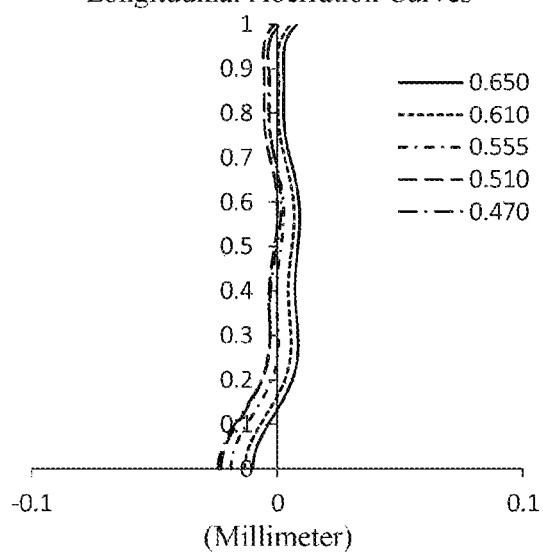
FIGS. 14A to 14C illustrate longitudinal aberration curves, astigmatic curves, and a lateral color curve of the optical imaging lens assembly of the example 7, respectively.
Figure 14B:
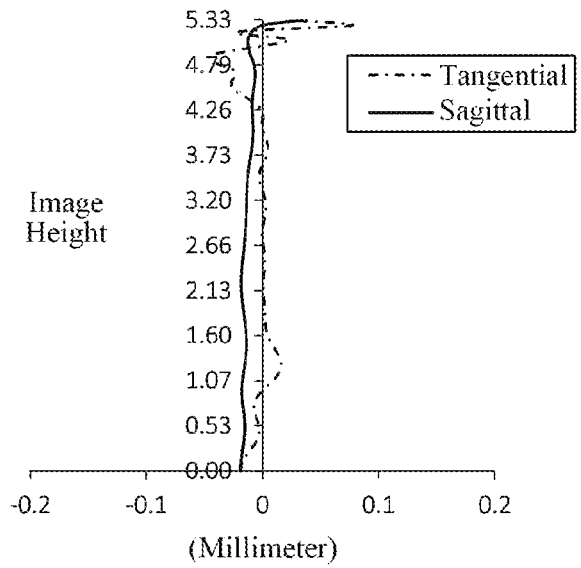
Figure 14C:
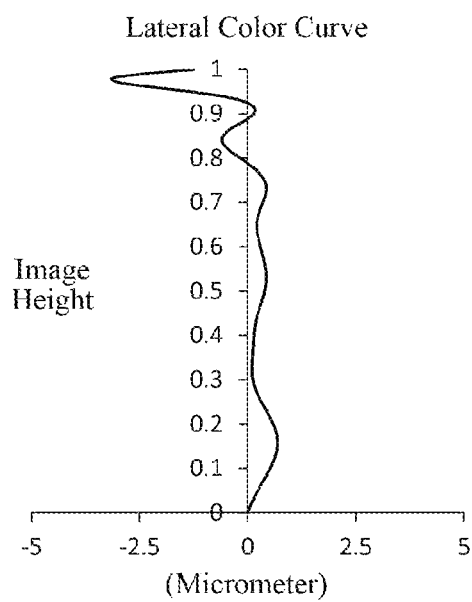

FIG. 14A illustrates longitudinal aberration curves of the optical imaging lens assembly according to example 7, representing the deviations of focal points converged by light of different wavelengths after passing through the lens assembly. FIG. 14B illustrates astigmatic curves of the optical imaging lens assembly according to example 7, representing the curvatures of a tangential plane and the curvatures of a sagittal plane. FIG. 14C illustrates a lateral color curve of the optical imaging lens assembly according to example 7, representing the deviations of different image heights on an imaging plane after light passes through the lens assembly. It can be seen from FIG. 14A to FIG. 14C that the optical imaging lens assembly provided in example 7 may achieve good image quality.

Example 8

Figure 15:
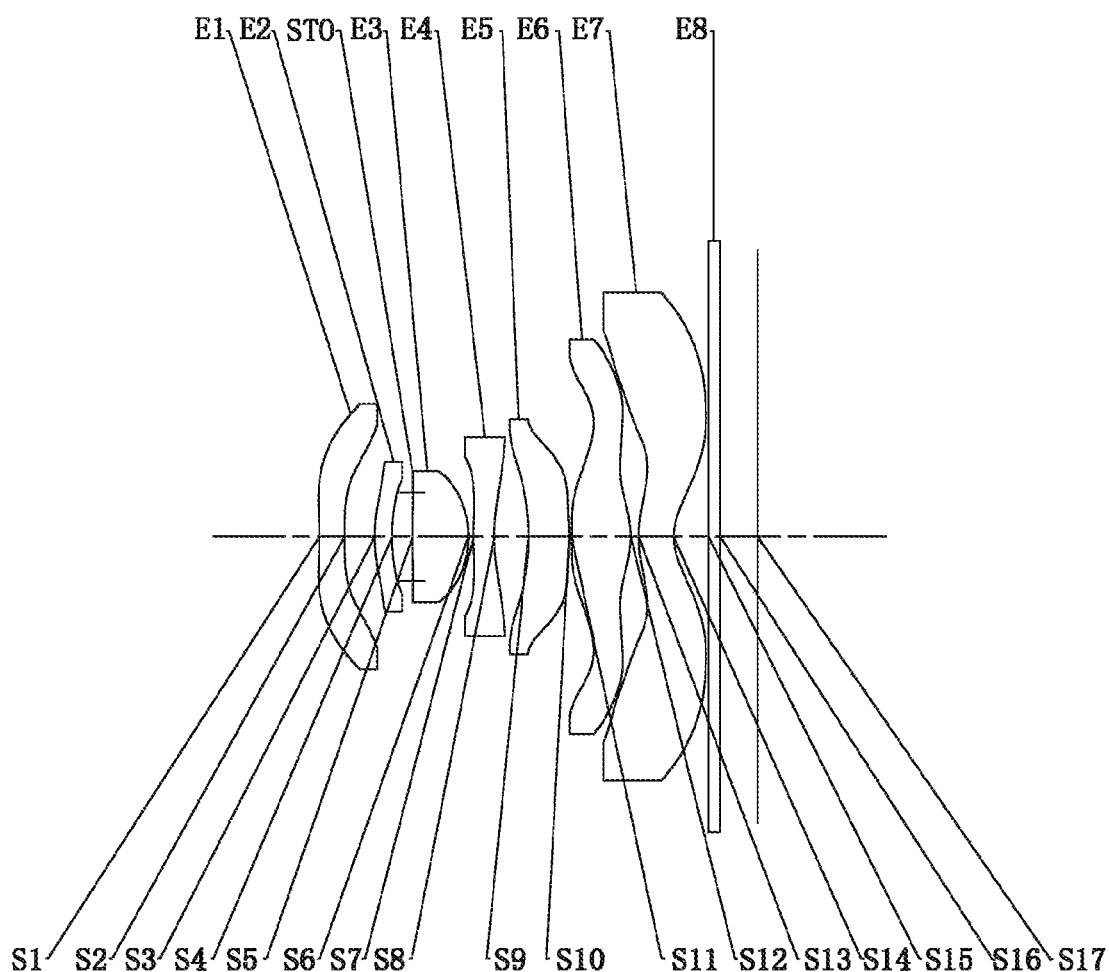
FIG. 15 illustrates a schematic structural view of an optical imaging lens assembly according to example 8 of the present disclosure.

An optical imaging lens assembly according to example 8 of the present disclosure is described below with reference to FIG. 15 to FIG. 16C. FIG. 15 shows a schematic structural view of the optical imaging lens assembly according to example 8 of the present disclosure.

As shown in FIG. 15, the optical imaging lens assembly includes a first lens E1, a second lens E2, a stop STO, a third lens E3, a fourth lens E4, a fifth lens E5, a sixth lens E6, a seventh lens E7 and an optical filter E8, which are sequentially arranged from an object side to an image side along an optical axis.

The first lens E1 has negative refractive power, an object-side surface S1 thereof is concave, and an image-side surface S2 thereof is concave. The second lens E2 has positive refractive power, an object-side surface S3 thereof is convex, and an image-side surface S4 thereof is concave. The third lens E3 has positive refractive power, an object-side surface S5 thereof is convex, and an image-side surface S6 thereof is convex. The fourth lens E4 has negative refractive power, an object-side surface S7 thereof is convex, and an image-side surface S8 thereof is concave. The fifth lens E5 has positive refractive power, an object-side surface S9 thereof is concave, and an image-side surface S10 thereof is convex. The sixth lens E6 has positive refractive power, an object-side surface S11 thereof is concave, and an image-side surface S12 thereof is convex. The seventh lens E7 has negative refractive power, an object-side surface S13 thereof is convex, and an image-side surface S14 thereof is concave. The optical filter E8 has an object-side surface S15 and an image-side surface S16. The optical imaging lens assembly has an imaging plane S17, and light from an object sequentially passes through the respective surfaces S1 to S16 and is finally imaged on the imaging plane S17.

In example 8, a total effective focal length f of the optical imaging lens assembly is 3.34 mm, an aperture number Fno of the optical imaging lens assembly is 2.27, a distance TTL along the optical axis from the object-side surface S1 of the first lens E1 to the imaging plane S17 is 7.96 mm, half of a diagonal length ImgH of an effective pixel area on the imaging plane S17 is 5.20 mm, and half of a maximum field-of-view Semi-FOV is 59.90°.

Table 15 is a table illustrating basic parameters of the optical imaging lens assembly of example 8, wherein the units for the radius of curvature, the thickness/distance and the focal length are millimeter (mm). Table 16 shows high-order coefficients applicable to each aspheric surface in example 8, wherein the surface shape of each aspheric surface may be defined by the formula (1) given in the above example 1.

TABLE 15

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Aspheric | −6.5264 | 0.4595 | 1.54 | 55.8 | −11.63 | 0.0000 |
| S2 | Aspheric | 146.0401 | 0.5462 | | | | 0.0000 |
| S3 | Aspheric | 3.2306 | 0.3163 | 1.57 | 37.3 | 33.81 | 0.0000 |
| S4 | Aspheric | 3.7427 | 0.3654 | | | | 0.0000 |
| STO | Spherical | Infinite | 0.0069 | | | | |
| S5 | Aspheric | 19.8507 | 1.0145 | 1.54 | 55.8 | 3.15 | −50.3876 |
| S6 | Aspheric | −1.8138 | 0.0958 | | | | 0.0000 |
| S7 | Aspheric | 8.1641 | 0.3730 | 1.67 | 20.4 | −8.00 | 0.0000 |
| S8 | Aspheric | 3.1683 | 0.6230 | | | | 0.0000 |
| S9 | Aspheric | −4.3203 | 0.7386 | 1.54 | 55.8 | 20.80 | 0.0000 |
| S10 | Aspheric | −3.3009 | 0.0425 | | | | 0.0000 |
| S11 | Aspheric | −12.1566 | 1.0738 | 1.55 | 56.1 | 3.37 | 0.0000 |
| S12 | Aspheric | −1.6493 | 0.1462 | | | | −1.0000 |
| S13 | Aspheric | 2.4194 | 0.6339 | 1.65 | 23.5 | −3.22 | −1.0459 |
| S14 | Aspheric | 1.0026 | 0.6360 | | | | −1.0000 |
| S15 | Spherical | Infinite | 0.2100 | 1.51 | 64.2 | | |
| S16 | Spherical | Infinite | 0.6814 | | | | |
| S17 | Spherical | Infinite | | | | | |

TABLE 16

| Surface number | A4 | A6 | A8 | A10 | A12 |
|---|---|---|---|---|---|
| S1 | 1.1278E−01 | −5.2505E−02 | 2.1643E−02 | −4.4541E−03 | −1.4010E−03 |
| S2 | 1.4823E−01 | −6.8167E−02 | 1.6960E−02 | 2.9470E−02 | −5.8202E−02 |
| S3 | 2.0729E−02 | −7.0346E−02 | 6.6663E−03 | 2.6572E−01 | −1.1145E+00 |
| S4 | 5.5097E−02 | −6.8538E−01 | 7.9736E+00 | −6.1805E+01 | 3.1959E+02 |
| S5 | −8.8548E−04 | −1.9958E−01 | 3.3754E+00 | −3.3784E+01 | 2.0365E+02 |

TABLE 16-continued

| | | | | | |
|---|---|---|---|---|---|
| S6 | −7.0811E−02 | 1.5975E−01 | −1.7272E−01 | −3.0734E−01 | 9.8730E−01 |
| S7 | −1.5677E−01 | 3.1498E−01 | −8.5376E−01 | 1.9967E+00 | −3.6139E+00 |
| S8 | −9.6184E−02 | 7.8544E−02 | −7.0944E−02 | 5.2849E−02 | −3.0278E−02 |
| S9 | −2.1153E−03 | 9.8633E−02 | −4.6506E−01 | 1.1042E+00 | −1.6692E+00 |
| S10 | 4.0497E−01 | −5.7805E−01 | 3.4488E−01 | −2.6406E−02 | −9.9936E−02 |
| S11 | 4.6084E−01 | −6.2848E−01 | 5.6510E−01 | −3.5246E−01 | 1.5498E−01 |
| S12 | 1.8457E−01 | −1.4901E−01 | 1.8676E−01 | −1.4867E−01 | 7.2029E−02 |
| S13 | −2.4716E−02 | −1.1389E−01 | 1.2908E−01 | −8.2744E−02 | 3.3766E−02 |
| S14 | −2.6218E−01 | 1.2935E−01 | −5.3833E−02 | 1.6792E−02 | −3.8660E−03 |

| Surface number | A14 | A16 | A18 | A20 |
|---|---|---|---|---|
| S1 | 1.5919E−03 | −6.8399E−04 | 1.7966E−04 | −3.0835E−05 |
| S2 | 5.71189E−02 | −3.7307E−02 | 1.6681E−02 | −5.0590E−03 |
| S3 | 2.5636E+00 | −3.8771E+00 | 4.0288E+00 | −2.8731E+00 |
| S4 | −1.1346E+03 | 2.8201E+03 | −4.9461E+03 | 6.0894E+03 |
| S5 | −7.8271E+02 | 1.9651E+03 | −3.2123E+03 | 3.2956E+03 |
| S6 | 4.1141E−02 | −4.2184E+00 | 8.7382E+00 | −9.0307E+00 |
| S7 | 4.7686E+00 | −4.4623E+00 | 2.8950E+00 | −1.2568E+00 |
| S8 | 1.2780E−02 | −3.7652E−03 | 7.1779E−04 | −7.8427E−05 |
| S9 | 1.7484E+00 | −1.3186E+00 | 7.2779E−01 | −2.9437E−01 |
| S10 | 4.8554E−02 | 1.9031E−02 | −3.2145E−02 | 1.7555E−02 |
| S11 | −4.8976E−02 | 1.1282E−02 | −1.9072E−03 | 2.3612E−04 |
| S12 | −2.2953E−02 | 5.0671E−03 | −7.9677E−04 | 9.0115E−05 |
| S13 | −9.1933E−03 | 1.7338E−03 | −2.3218E−04 | 2.2327E−05 |
| S14 | 6.6352E−04 | −8.5427E−05 | 8.2359E−06 | −5.8910E−07 |

Figure 16A:
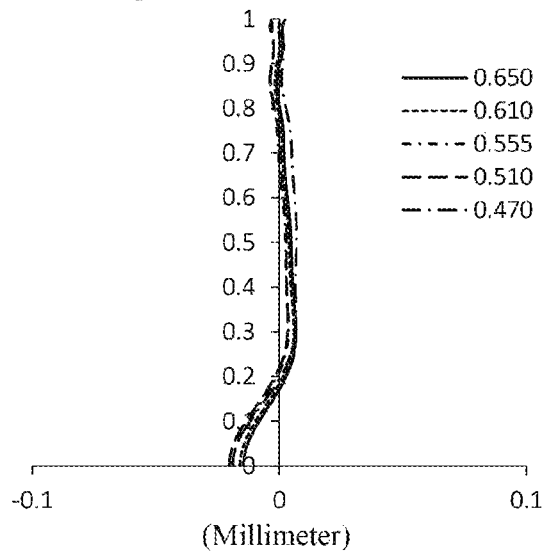
FIGS. 16A to 16C illustrate longitudinal aberration curves, astigmatic curves, and a lateral color curve of the optical imaging lens assembly of the example 8, respectively.
Figure 16B:
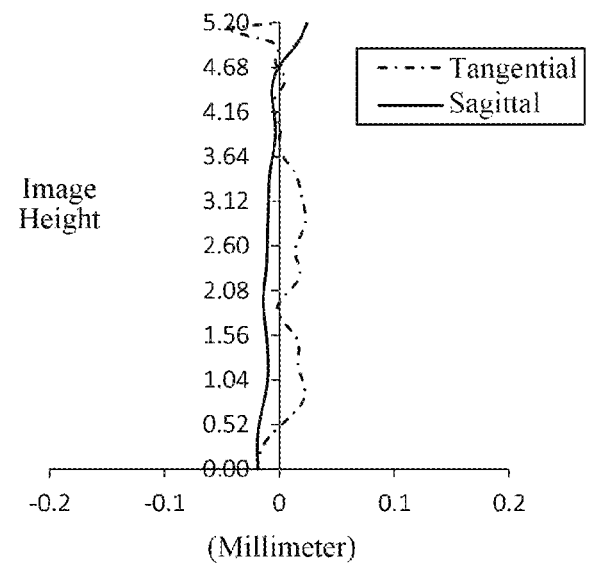
Figure 16C:
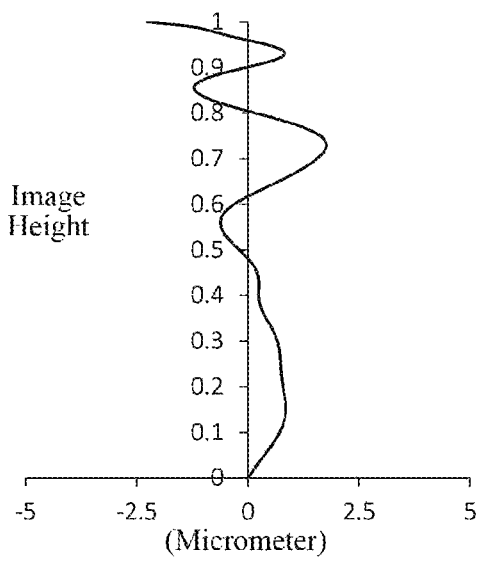

FIG. 16A illustrates longitudinal aberration curves of the optical imaging lens assembly according to example 8, representing the deviations of focal points converged by light of different wavelengths after passing through the lens assembly. FIG. 16B illustrates astigmatic curves of the optical imaging lens assembly according to example 8, representing the curvatures of a tangential plane and the curvatures of a sagittal plane. FIG. 16C illustrates a lateral color curve of the optical imaging lens assembly according to example 8, representing the deviations of different image heights on an imaging plane after light passes through the lens assembly. It can be seen from FIG. 16A to FIG. 16C that the optical imaging lens assembly provided in example 8 may achieve good image quality.

In view of the above, examples 1 to 8 respectively satisfy the relationship shown in Table 17.

TABLE 17

| | Example | | | | | | | |
|---|---|---|---|---|---|---|---|---|
| Conditional | 1 | 2 | 3 | 4 | 5 | 6 | 7 | 8 |
| f*tan(Semi-FOV) (mm) | 6.17 | 6.09 | 5.80 | 5.66 | 5.66 | 6.11 | 6.01 | 5.77 |
| TTL/ImgH | 1.47 | 1.46 | 1.50 | 1.52 | 1.52 | 1.45 | 1.50 | 1.53 |
| \|f7/R13\| | 1.67 | 1.32 | 1.29 | 1.53 | 0.89 | 1.34 | 1.34 | 1.33 |
| (R7 + R8)/R8 | 3.81 | 3.59 | 3.61 | 4.03 | 1.99 | 3.58 | 3.19 | 3.58 |
| \|f/f6\| + \|f/17\| | 2.72 | 2.91 | 2.92 | 2.73 | 3.15 | 2.86 | 3.04 | 2.03 |
| (CT1 + CT2 + CT3)/T23 | 5.35 | 5.58 | 5.64 | 6.03 | 5.06 | 5.86 | 7.39 | 4.81 |
| R7/f | 2.84 | 2.49 | 2.50 | 3.48 | 0.97 | 2.41 | 2.02 | 2.44 |
| SAG11/SAG71 | −1.17 | −1.03 | −1.04 | −1.46 | −1.30 | −0.97 | −1.18 | −1.15 |
| ET3/SAG32 | −0.90 | −0.77 | −0.79 | −0.96 | −0.93 | −0.81 | −0.93 | −0.86 |
| f234/f | 1.21 | 1.61 | 1.68 | 1.26 | 1.09 | 1.79 | 1.34 | 1.29 |
| ET7 (mm) | 1.24 | 1.24 | 1.20 | 1.13 | 1.24 | 1.22 | 1.16 | 1.05 |

The present disclosure further provides an imaging apparatus, which is provided with an electronic photosensitive element for imaging. The electronic photosensitive element may be a photosensitive Charge-Coupled Device (CCD) or a Complementary Metal-Oxide Semiconductor (CMOS). The imaging apparatus may be an independent imaging device such as a digital camera, or may be an imaging module integrated in a mobile electronic device such as a mobile phone. The imaging apparatus is equipped with the optical imaging lens assembly described above.

The foregoing is only a description of the preferred examples of the present disclosure and the applied technical principles. It should be appreciated by those skilled in the art that the protective scope of the present disclosure is not limited to the technical solutions formed by the particular combinations of the above technical features. The protective scope should also cover other technical solutions formed by any combinations of the above technical features or equivalent features thereof without departing from the concept of the present disclosure, such as, technical solutions formed by replacing the features as disclosed in the present disclosure with (but not limited to), technical features with similar functions.

What is claimed is:

1. An optical imaging lens assembly, sequentially from an object side to an image side of the optical imaging lens assembly along an optical axis, comprising:
   a first lens having negative refractive power;
   a second lens having refractive power;
   a third lens;
   a fourth lens having refractive power, a convex object-side surface and a concave image-side surface;

a fifth lens having refractive power and a concave object-side surface;
a sixth lens; and
a seventh lens,
wherein ImgH≥5.20 mm, where ImgH is half of a diagonal length of an effective pixel area on an imaging plane of the optical imaging lens assembly;
wherein 5 mm<f*tan (Semi-FOV)<7 mm, where f is a total effective focal length of the optical imaging lens assembly, and Semi-FOV is half of a maximum field-of-view of the optical imaging lens assembly; and
wherein 0.5<R7/f<3.5, where R7 is a radius of curvature of the object-side surface of the fourth lens, and f is a total effective focal length of the optical imaging lens assembly.

2. The optical imaging lens assembly according to claim 1, wherein 110°<FOV<130°,
where FOV is a maximum field-of-view of the optical imaging lens assembly.

3. The optical imaging lens assembly according to claim 1, wherein TTL/ImgH<1.55,
where TTL is a distance along the optical axis from an object-side surface of the first lens to the imaging plane, and ImgH is half of the diagonal length of the effective pixel area on the imaging plane.

4. The optical imaging lens assembly according to claim 1, wherein |f7/R13|<1.7,
where f7 is an effective focal length of the seventh lens, and R13 is a radius of curvature of an object-side surface of the seventh lens.

5. The optical imaging lens assembly according to claim 1, wherein 1.5<(R7+R8)/R8<4.1,
where R7 is a radius of curvature of the object-side surface of the fourth lens, and R8 is a radius of curvature of the image-side surface of the fourth lens.

6. The optical imaging lens assembly according to claim 1, wherein 2.0<|f/f6|+|f/f7|<3.5,
where f is a total effective focal length of the optical imaging lens assembly, f6 is an effective focal length of the sixth lens, and f7 is an effective focal length of the seventh lens.

7. The optical imaging lens assembly according to claim 1, wherein 4.5< (CT1+CT2+CT3)/T23<7.5,
where CT1 is a center thickness of the first lens along the optical axis, CT2 is a center thickness of the second lens along the optical axis, CT3 is a center thickness of the third lens along the optical axis, and T23 is a spaced interval between the second lens and the third lens along the optical axis.

8. The optical imaging lens assembly according to claim 1, wherein−2<SAG11/SAG71<0,
where SAG11 is an on-axis distance from an intersection of an object-side surface of the first lens and the optical axis to a vertex of an effective radius of the object-side surface of the first lens, and SAG71 is an on-axis distance from an intersection of an object-side surface of the seventh lens and the optical axis to a vertex of an effective radius of the object-side surface of the seventh lens.

9. The optical imaging lens assembly according to claim 1, wherein −1.0<ET3/SAG32<−0.5,
where ET3 is an edge thickness of the third lens, and SAG32 is an on-axis distance from an intersection of an image-side surface of the third lens and the optical axis to a vertex of an effective radius of the image-side surface of the third lens.

10. The optical imaging lens assembly according to claim 1, wherein 1.0<f234/f<2.0,
where f234 is a combined focal length of the second lens, the third lens, and the fourth lens, and f is a total effective focal length of the optical imaging lens assembly.

11. The optical imaging lens assembly according to claim 1, wherein 1.0 mm<ET7<1.5 mm,
where ET7 is an edge thickness of the seventh lens.

12. The optical imaging lens assembly according to claim 1, wherein an object-side surface of the seventh lens is convex, and an image-side surface of the seventh lens is concave.

13. An optical imaging lens assembly, sequentially from an object side to an image side of the optical imaging lens assembly along an optical axis, comprising:
a first lens having negative refractive power;
a second lens having refractive power;
a third lens;
a fourth lens having refractive power, a convex object-side surface and a concave image-side surface;
a fifth lens having refractive power;
a sixth lens; and
a seventh lens,
wherein 5 mm<f*tan (Semi-FOV)<7 mm, where f is a total effective focal length of the optical imaging lens assembly, and Semi-FOV is half of a maximum field-of-view of the optical imaging lens assembly;
wherein TTL/ImgH<1.55, where TTL is a distance along the optical axis from an object-side surface of the first lens to the imaging plane, and ImgH is half of the diagonal length of the effective pixel area on the imaging plane; and
wherein 0.5<R7/f<3.5, where R7 is a radius of curvature of the object-side surface of the fourth lens, and f is the total effective focal length of the optical imaging lens assembly.

14. The optical imaging lens assembly according to claim 13, wherein 110°<FOV<130°,
where FOV is a maximum field-of-view of the optical imaging lens assembly.

15. The optical imaging lens assembly according to claim 13, wherein 2.0<|f/f6|+|f/f7|<3.5,
where f is the total effective focal length of the optical imaging lens assembly, f6 is an effective focal length of the sixth lens, and f7 is an effective focal length of the seventh lens.

16. The optical imaging lens assembly according to claim 13, wherein 4.5<(CT1+CT2+CT3)/T23<7.5,
where CT1 is a center thickness of the first lens along the optical axis, CT2 is a center thickness of the second lens along the optical axis, CT3 is a center thickness of the third lens along the optical axis, and T23 is a spaced interval between the second lens and the third lens along the optical axis.

* * * * *